United States Patent
Gassner et al.

(10) Patent No.: US 12,470,545 B2
(45) Date of Patent: Nov. 11, 2025

(54) SYSTEM AND METHOD FOR IMPROVED USER AUTHENTICATION IN A MULTISYSTEM NETWORK

(71) Applicant: Veeva Systems Inc., Pleasanton, CA (US)

(72) Inventors: Peter Gassner, Pleasanton, CA (US); Jean-Christophe Meriaux, Concord, CA (US); Bryan Gilbert Lim, Laguna Beach, CA (US); Nathan Joseph Janken, Dublin, CA (US)

(73) Assignee: Veeva Systems Inc., Pleasanton, CA (US)

( * ) Notice: Subject to any disclaimer, the term of this patent is extended or adjusted under 35 U.S.C. 154(b) by 120 days.

(21) Appl. No.: 18/398,304

(22) Filed: Dec. 28, 2023

(65) Prior Publication Data

US 2025/0193171 A1 Jun. 12, 2025

Related U.S. Application Data

(63) Continuation of application No. 18/531,546, filed on Dec. 6, 2023.

(51) Int. Cl.
*H04L 9/40* (2022.01)

(52) U.S. Cl.
CPC ................... *H04L 63/083* (2013.01)

(58) Field of Classification Search
CPC ...................................... H04L 63/083
See application file for complete search history.

(56) References Cited

U.S. PATENT DOCUMENTS

| 11,888,870 | B2 * | 1/2024 | Garyani | G06F 21/554 |
| 2014/0025443 | A1 * | 1/2014 | Onischuk | G07C 13/00 |
| | | | | 705/12 |
| 2020/0211004 | A1 * | 7/2020 | Ng | G06Q 20/3829 |

* cited by examiner

*Primary Examiner* — Sm A Rahman
(74) *Attorney, Agent, or Firm* — Finnegan, Henderson, Farabow, Garrett & Dunner, LLP

(57) ABSTRACT

Disclosed is a method, system, and computer program product for using a multisystem data collection computing input tool. Data associated with plurality of sources is received and transformed to be stored in a specialized database and format. Access to the specialized database is enabled over a multisystem network such that a user may view and update the data in real time through a graphical user interface. In some embodiments, updates to data are automatically occurring in real time without user instruction.

20 Claims, 26 Drawing Sheets

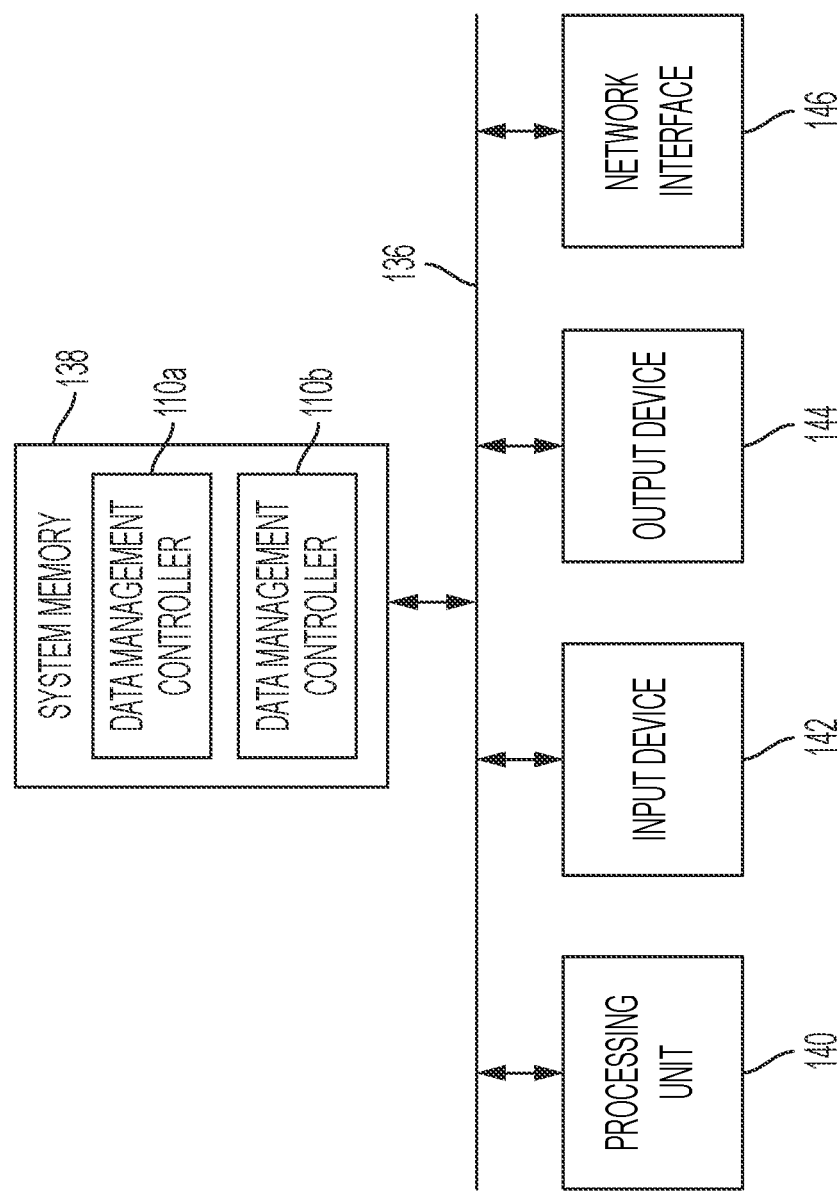

| Party Identification | Home | My Account | | | ⇧ |
|---|---|---|---|---|---|
| My Systems | | | | | |
| Search 🔍 | | | | | 1 - 4 of 4 |
| Name | | Organization Name | Last Login ▲ | Organization Identifier | |
| System Name 01 ⓘ | | Organization 01 | 10 minutes ago | Identifier 01 | |
| System Name 02 | | Organization 01 | 2 hours ago | Identifier 01 | |
| System Name 03 | | Organization 02 | 5 hours ago | Identifier 02 | |
| System Name 04 ⓘ | | Organization 03 | 5 days ago | Identifier 03 | |

Party System 002

Feature 01 | Feature 02 ▾ | Feature 03 ▾ | Feature 04 | Subjects ▾ | Feature 05 | Feature 06 | Feature 07 | Feature 08 | Feature 09 | Feature 10 | Feature 11 ▾

🏠 > Folder 001 🔍 > 101 🔍 > Search Subject

SITE TASKS 453
Forms 19
⊙ 2
Queries 432

+ New Casebook | Subject Status: All ▾ | Signature completed: All ▾

1-14 of 14 | + Create ▾

| Subject | Last Event | Next Event | Subject Status | Signature completed |
|---|---|---|---|---|
| Subject 01 | Event 01 | Upcoming Event 01 | Status 01 | No |
| Subject 02 | Event 02 |  | Status 02 | No |
| Subject 03 | Event 03 |  | Status 03 | No |
| Subject 04 | Event 04 |  | Status 04 | No |
| Subject 05 | Event 05 |  | Status 05 | No |
| Subject 06 | Event 06 |  | Status 06 | No |
| Subject 07 | Event 07 |  | Status 07 | No |
| Subject 08 | Event 08 |  | Status 08 | No |
| Subject 09 | Event 09 | Upcoming Event 02 | Status 09 | No |
| Subject 10 | Event 10 |  | Status 10 | No |
| Subject 11 | Event 11 | Upcoming Event 03 | Status 11 | No |
| Subject 12 |  |  | Status 12 | No |
| Subject 13 |  | Upcoming Event 04 | Status 13 | No |
| Subject 14 |  | Upcoming Event 05 | Status 14 | No |

SYSTEM AND METHOD FOR IMPROVED USER AUTHENTICATION IN A MULTISYSTEM NETWORK

CROSS-REFERENCE TO RELATED APPLICATIONS

This application is a continuation of U.S. application Ser. No. 18/531,546, filed on Dec. 6, 2023, the disclosure of which is incorporated herein by reference in its entirety for all purposes.

TECHNICAL FIELD

The present disclosure relates to systems and methods for improving user authentication within a multisystem network.

BACKGROUND

There is an increasing number of software programs requiring authentication data to access data and tools to collect, analyze, and solve problems in multiple industries. Therefore, there is a need for database systems, architectures, and applications that provide seamless mechanisms for compiling and amalgamating authentication data for a plurality of sources. The systems, architectures, and applications should meaningfully aggregate compiled data into a data structure to facilitate efficient execution of authentication operations, securely transmit the data to client systems for additional validation and/or further instructions, and facilitate and expedite access to client systems and software. More importantly, there is a need for interconnectivity between database systems, architectures, and applications to facilitate optimal execution of authentication operations directed to health applications, agriculture applications, education applications, government applications, defense applications, etc.

SUMMARY

Disclosed is methods, systems, and computer program products for using a multisystem data collection computing input tool. According to one implementation, a method comprises receiving, using one or more first servers, from a first computing device, identification data, wherein the identification data is associated with a first user and associated with a first authentication system. The method may also comprise generating or receiving, using the one or more first servers, in response to receiving identification data, from the first computing device, via a first user interface, first authentication data, wherein the first authentication data is associated with the identification data. The method may also comprise receiving, using the one or more first servers, from the first computing device, via a second user interface, the first authentication data. The method may also comprise executing, using the one or more first servers, a first authentication operation based on the first authentication data. The method may also comprise in response to successful first authentication based on the first authentication data, enabling access to, using the one or more first servers, a multisystem data collection computing input tool. The method may also comprise receiving, using the one or more first servers, from the first computing device, a first input data, via the multisystem data collection computing input tool. The method may also comprise generating, using the one or more first servers, based on the first data input, one or more computing profiles. The method may also comprise receiving, using the one or more first servers, from the first computing device, one or more system data associated with the one or more computing profiles, via the multisystem data collection computing input tool. The method may also comprise generating, using the one or more first servers, based on the one or more system data, one or more first selectable objects. The method may also comprise receiving, using the one or more first servers, a selection of a first object from the one or more first selectable objects. The method may also comprise in response to receiving the selection of the first object from the one or more first selectable objects, executing, using the one or more first servers, a second authentication operation based on the one or more system data, thereby bypassing prompting of user input of second authentication data for authenticating to a computing system. The method may also comprise in response to successful second authentication, enabling, using the one or more first servers, access to the computing system.

In some embodiments, at least one of the identification data, the first authentication data, the first input data, and the one or more system data are received from or configured by the first user. In one implementation, the method may further comprise transmitting, from the one or more first servers to one or more storage systems, the one or more first selectable objects, the one or more system data, the one or more computing profiles, and the first authentication data. In some embodiments the one or more storage systems are accessed with the multisystem data collection computing input tool. In some embodiments, the first authentication data comprises a username and password associated to the first user and to the multisystem data collection computing input tool. In some embodiments, the first input data comprises data associated with a study, wherein the data associated with the study comprises one or more network control terminal data associated with the study. In some embodiments, the one or more system data comprises at least one of one or more computing data, one or more uniform resource locators associated with the one or more computing data, one or more identification data, and one or more authentication data. In some embodiments, the one or more first selectable objects comprise one or more hyperlinks, digital commands, or reproducible digital files to save or copy one or more system data components associated with the system data. In some embodiments, the one or more first selectable objects comprise one or more hyperlinks to bypass one or more authentication operations, wherein the one or more authentication operations comprises the second authentication operation. In some embodiments, the system data comprises at least one of one or more support uniform resource locator data, one or more support communication data, and one or more user-generated data. According to some implementations, the method may further comprise generating, using the one or more first servers, based on the one or more system data, via the multisystem data collection computing input tool, one or more second selectable objects. The method may further comprise receiving a selection of a second object from the one or more second selectable objects. The method may further comprise in response to receiving the selection of the second object from the one or more second selectable objects, executing a reproduction and transmission operation associated with the one or more system data.

According to one implementation, a system may receive, from a first computing device, identification data, wherein the identification data is associated with a first user and associated with a first authentication system. In some embodiments, the system may generate or receive, in response to receiving identification data, from the first computing device, via a first user interface, first authentication data, wherein the first authentication data is associated with the identification data. In some embodiments, the system may receive, from the first computing device, via a second user interface, the first authentication data. In some embodiments, the system may execute, a first authentication operation based on the first authentication data. In some embodiments, the system may in response to successful first authentication based on the first authentication data, enable access to, a multisystem data collection computing input tool. In some embodiments, the system may receive, from the first computing device, a first input data, via the multisystem data collection computing input tool. In some embodiments, the system may generate, based on the first data input, one or more computing profiles. In some embodiments, the system may receive, from the first computing device, one or more system data associated with the one or more computing profiles, via the multisystem data collection computing input tool. In some embodiments, the system may generate, based on the one or more system data, one or more first selectable objects. In some embodiments, the system may receive, a selection of a first object from the one or more first selectable objects. In some embodiments, the system may in response to receiving the selection of the first object from the one or more first selectable objects, execute, a second authentication operation based on the one or more system data, thereby bypassing prompting of user input of second authentication data for authenticating to a computing system. In some embodiments, the system may in response to successful second authentication, enable, access to the computing system. In some embodiments, the one or more computing system processors, and the first computing device communicate via a cloud-based network. In some embodiments, the one or more computing system processors are comprised in at least one of the first computing device or one or more servers located in at least one of more geographical locations. According to some implementations, the system may transmit, from the one or more first servers to one or more storage systems, at least one of the one or more first selectable objects, the one or more system data, the one or more computing profiles, and the first authentication data.

According to one implementation, a computer program product may receive, from a first computing device, identification data, wherein the identification data is associated with a first user and associated with a first authentication system. In some embodiments, the computer program product may generate or receive, in response to receiving identification data, from the first computing device, via a first user interface, first authentication data, wherein the first authentication data is associated with the identification data. In some embodiments, the computer program product may receive, from the first computing device, via a second user interface, the first authentication data. In some embodiments, the computer program product may execute, a first authentication operation based on the first authentication data. In some embodiments, the computer program product may in response to successful first authentication based on the first authentication data, enable access to, a multisystem data collection computing input tool. In some embodiments, the computer program product may receive, from the first computing device, a first input data, via the multisystem data collection computing input tool. In some embodiments, the computer program product may generate, based on the first data input, one or more computing profiles. In some embodiments, the computer program product may receive, from the first computing device, one or more system data associated with the one or more computing profiles, via the multisystem data collection computing input tool. In some embodiments, the computer program product may generate, based on the one or more system data, one or more first selectable objects. In some embodiments, the computer program product may receive, a selection of a first object from the one or more first selectable objects. In some embodiments, the computer program product may in response to receiving the selection of the first object from the one or more first selectable objects, execute, a second authentication operation based on the one or more system data, thereby bypassing prompting of user input of second authentication data for authenticating to a computing system. In some embodiments, the computer program product may in response to successful second authentication, enable, access to the computing system. In some embodiments of the computer program product, the first authentication data is received from or configured by a user. In some embodiments of the computer program product, the one or more system data are received from or configured by a user. In some embodiments, the computer program product may transmit, from the one or more first servers to one or more storage systems, at least one of the one or more first selectable objects, the one or more system data, the one or more computing profiles, and the first authentication data. In some embodiments of the computer program product, the one or more storage systems are accessible with the multisystem data collection computing input tool.

According to some implementations, a method comprises enabling, using one or more first servers, a first computing device to access a first multisystem data collection computing input tool registration interface. The method may further comprise receiving, from the first computing device, a first identification data, via the first multisystem data collection computing input tool registration interface, wherein the first identification data is associated with a first user. The method may further comprise in response to receiving the first identification data, transmitting, using the one or more first servers, to the first computing device, a verification message with one or more selectable verification objects. The method may also comprise receiving, using the one or more first servers, a selection of a first object from the one or more selectable verification objects. The method may also comprise in response to receiving the selection of the first object from the one or more selectable verification objects, enabling access to, using the one or more first servers, a second multisystem data collection computing input tool registration interface. The method may also comprise receiving, using the one or more first servers, from the first computing device, one or more second identification data, via the second multisystem data collection computing input tool registration interface, wherein the one or more second identification data is associated with the first user. The method may also comprise in response to receiving the one or more second identification data, enabling access to, using the one or more first servers, using the second identification data, a multisystem data collection computing input tool.

In some embodiments, the first identification data and the one or more second identification data are received from or configured by the first user. In some embodiments, the first identification data comprises an email address. In some embodiments, the second identification data comprises at least one of a username, a user's first name, a user's last name, a user-preferred language, a user-preferred time zone, and a login password. In some embodiments, the login password meets one or more password security requirements. In some embodiments, the first identification data is identical to the username in the second identification data. In some embodiments, the one or more selectable verification objects comprise one or more hyperlinks or digital selectable icons to verify the ownership of an email address. In some embodiments, the verification message comprises a confirmation email.

According to some implementations, a system may enable a first computing device to access a first multisystem data collection computing input tool registration interface. In some embodiments, the system may receive, from the first computing device, a first identification data, via the first multisystem data collection computing input tool registration interface, wherein the first identification data is associated with a first user. In some embodiments, the system may in response to receiving the first identification data, transmit, to the first computing device, a verification message with one or more selectable verification objects. In some embodiments, the system may receive a selection of a first object from the one or more selectable verification objects. In some embodiments, the system may in response to receiving the selection of the first object from the one or more selectable verification objects, enable access to a second multisystem data collection computing input tool registration interface. In some embodiments, the system may receive, from the first computing device, one or more second identification data, via the second multisystem data collection computing input tool registration interface, wherein the one or more second identification data is associated with the first user. In some embodiments, the system may in response to receiving the one or more second identification data, enable access to, using the second identification data, a multisystem data collection computing input tool. In some embodiments, the one or more computing system processors and the first computing device communicate via a cloud-based network. In some embodiments, the one or more computing system processors and the first computing device communicate via a local network. In some embodiments, the first identification data and the one or more second identification data are received from or configured by the first user. In some embodiments, the one or more computing system processors are comprised in at least one of the first computing device or one or more servers located in at least one of more geographical locations.

According to some implementations, a computer program product may enable a first computing device to access a first multisystem data collection computing input tool registration interface. In some embodiments, the computer program product may receive, from the first computing device, a first identification data, via the first multisystem data collection computing input tool registration interface, wherein the first identification data is associated with a first user. In some embodiments, the computer program product may in response to receiving the first identification data, transmit, to the first computing device, a verification message with one or more selectable verification objects. In some embodiments, the computer program product may receive, a selection of a first object from the one or more selectable verification objects. In some embodiments, the computer program product may in response to receiving the selection of the first object from the one or more selectable verification objects, enable access to a second multisystem data collection computing input tool registration interface. In some embodiments, the computer program product may receive, from the first computing device, one or more second identification data, via the second multisystem data collection computing input tool registration interface, wherein the one or more second identification data is associated with the first user. In some embodiments, the computer program product may in response to receiving the one or more second identification data, enable access to, using the second identification data, a multisystem data collection computing input tool. In some embodiments, the first identification data is received from or configured by a second user. In some embodiments, the one or more second identification data are received from or configured by the first user. In some embodiments, the first identification data comprises an email address. In some embodiments, the second identification data comprises at least one of a username, a user's first name, a user's last name, a user-preferred language, a user preferred time zone, and a login password. In some embodiments, the login password satisfies one or more password security requirements. In some embodiments, the first identification data is identical to the username in the second identification data.

BRIEF DESCRIPTION OF THE DRAWINGS

The disclosure is illustrated by way of example, and not by way of limitation in the figures of the accompanying drawings in which like reference numerals are used to refer to similar elements. It is emphasized that various features may not be drawn to scale, and the dimensions of various features may be arbitrarily increased or reduced for clarity of discussion. Further, some components may be omitted in certain figures for clarity of discussion.

FIG. 1C illustrates an example high level block diagram of the data management server according to some embodiments of the present invention.

FIGS. 7A-7B show two potential embodiments of a user interface associated with a multisystem network on an endpoint (or computing) device for interaction by users.

FIG. 16 shows an eighth potential embodiment of a user interface associated with a multisystem network on an endpoint (or computing) device for interaction by users.

Although similar reference numbers may be used to refer to similar elements for convenience, it can be appreciated that each of the various example embodiments may be considered distinct variations. As used in this disclosure, the terms "embodiment" and "example embodiment" do not necessarily refer to a single embodiment, although it may, and various example embodiments be readily combined and interchanged, without departing from the scope or spirit of the present disclosure. Furthermore, the terminology as used herein is for the purpose of describing example embodiments only and are not intended to be limitations. In this respect, as used herein, the term "in" may include "in" and "on," and the terms "a," "an" and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated listed items.

DETAILED DESCRIPTION

System Environment

Figure 1A:
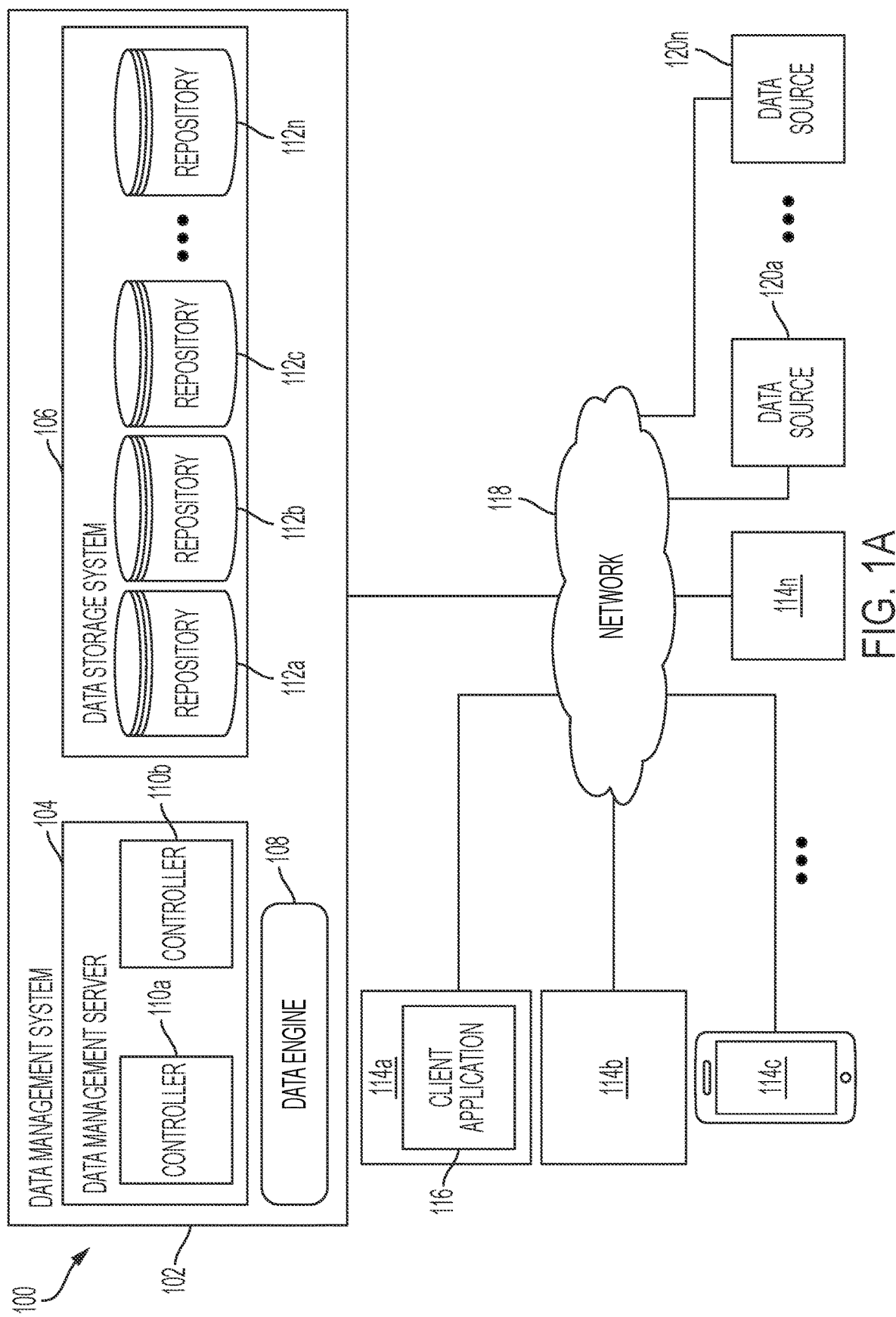
FIG. 1A illustrates an example high level block diagram of a data management architecture wherein the present technology may be implemented according to some embodiments of the present invention.

FIG. 1A illustrates an example high level block diagram of a data management architecture 100 wherein the present invention may be implemented. As shown, the architecture 100 may include a data management system 102 and a plurality of user computing devices 114*a*, 114*b*, . . . 114*n*, coupled to each other via a network 118. The data management system 102 may include a data storage system 106 and a data management server 104. The data storage system 106 may have two or more repositories, e.g., 112*a*, 112*b*, 112*c*, . . . and 112*n*. The network 118 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 114*a*-114*n* may be any machine or system that is used by a user to access the data management system 102 via the network 118, and may be any commercially available computing devices including laptop computers, desktop computers, mobile phones, smart phones, tablet computers, netbooks, and personal digital assistants (PDAs). A client application 116 may run from a user computing device, e.g., 114*a*, and access data in the data management system 102 via the network 118.

The data storage system 106 may store data that client applications (e.g., 116) in user computing devices 114*a*-114*n* may access and may be any commercially available storage devices. Each content repository (e.g., 112*a*, 112*b* or 112*n*) may store a specific category of data and allow users to interact with its data in a specific business context. It should be appreciated that content repositories may be separate logic sections in a same storage device.

The data management server 104 is typically a remote computer system accessible over a remote or local network, such as the network 118. The data management server 104 may store a data management controller 110*a* and a data collection controller 110*b* for controlling management and collection of the data. The data management server 104 could be any commercially available computing devices. Although only one server is shown, it should be appreciated that the data management system 102 may have a plurality of servers and the controllers 110*a* and 110*b* may be in separate servers. A client application (e.g., 116) process may be active on one or more user computing devices 114*a*-114*n*. The corresponding server process may be active on the data management server 104. The client application process and the corresponding server process may communicate with each other over the network 118, thus providing distributed functionality and allowing multiple client applications to take advantage of the information-gathering capabilities of the data management system 102. Moreover, the data engine 108 shown within the data management system 102 may include one or more units, including a data aggregation unit 172, a data cleaning unit 174, and a data transformation unit 176. These and other aspects are further discussed below in association with FIG. 1D.

In one implementation, the architecture 100 may be used for collecting and managing data, e.g., authentication data. In some embodiments, the authentication data as described in this disclosure may refer to usernames and passwords associated with software used to conduct studies. A first repository (e.g., 112*a*) may be used by an individual to store their personal login information received from a first user computing device (e.g., 114*a*). The personal login information may comprise names, email addresses, native languages, locales, time zones, vault access information, usernames, passwords, etc.

In one implementation, the data management system 102 may be a multisystem network where various elements of hardware and software may be shared by one or more customers. For instance, a server may simultaneously process requests from a plurality of customers (e.g., sponsors, sites, etc.), and the data storage system 106 may store content for a plurality of customers (e.g., sponsors, sites, etc.). In a multisystem network, a user is typically associated with a particular customer. In one embodiment, the data management system 102 may run on a cloud computing platform. Users can access content on the cloud independently by using a virtual machine image or purchasing access to a service maintained by a cloud database provider.

In one embodiment, the data management system 102 may be provided as Software as a Service ("SaaS") to allow users to access the data management system 102 with a client.

Data sources 120a . . . 120n may be configured to transmit and/or receive data to and from the data management system 102. In particular, the data from the data sources 120a . . . 120n may include data from a plurality of different sources that generate data in similar and/or in dissimilar formats. It is appreciated that the data from one or more of the data sources 120a . . . 120n may include data from one or more servers associated with medical institutions, government institutions, educational institutions, agricultural agencies, defense contractor institutions, etc., according to some embodiments. It is appreciated that the data from the one or more of the data sources 120a . . . 120n may be representative data such as a symbol, placeholder, or other identifying character that represents data in similar and/or in dissimilar formats such that the content repository 113 may interpret the representative data to determine the data it represents.

Figure 1B:
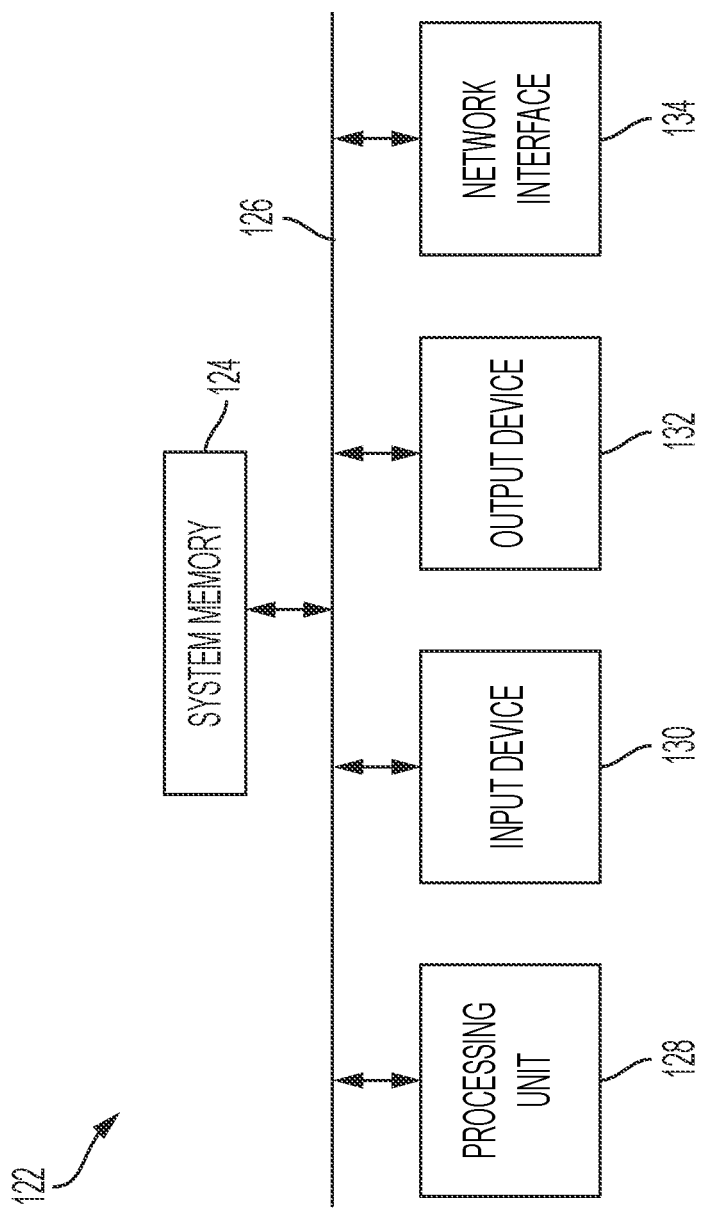
FIG. 1B illustrates an example block diagram of a computing device according to some embodiments of the present invention.

FIG. 1B illustrates an example block diagram of a computing device 122 which can be used as the user computing devices 114a-114n, and the data management server 104 in FIG. 1A. The computing device 122 is only one example of a suitable computing environment and is not intended to suggest any limitation as to scope of use or functionality. The computing device 122 may include a processing unit 128, a system memory 124, an input device 130, an output device 132, a network interface 134 and a system bus 126 that couples these components to each other.

The processing unit 128 may be configured to execute computer instructions that are stored in a computer-readable medium, for example, the system memory 124. The processing unit 128 may be a central processing unit (CPU).

The system memory 124 typically includes a variety of computer readable media which may be any available media accessible by the processing unit 128. For instance, the system memory 124 may include computer storage media in the form of volatile and/or nonvolatile memory such as read only memory (ROM) and/or random-access memory (RAM). By way of example, but not limitation, the system memory 124 may store instructions and data, e.g., an operating system, program modules, various application programs, and program data.

A user can enter commands and information to the computing device 122 through the input device 130. The input device 130 may be, e.g., a keyboard, a touchscreen input device, a touch pad, a mouse, a microphone, and/or a pen.

The computing device 122 may provide its output via the output device 132 which may be, e.g., a monitor or other type of display device, a speaker, or a printer.

The computing device 122, through the network interface 134, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 118) and/or buses. The network interface 134 may be configured to allow the computing device 122 to transmit and receive data in a network, for example, the network 118. The network interface 134 may include one or more network interface cards (NICs).

FIG. 1C illustrates an example high level block diagram of the data management server 104 according to one embodiment of the present disclosure. The data management server 104 may be implemented by the computing device 122, and may have a processing unit 140, a system memory 138, an input device 142, an output device 144, and a network interface 146, coupled to each other via a system bus 136. The system memory 138 may store a data management controller 110a and/or a data collection controller 110b.

Figure 1D:
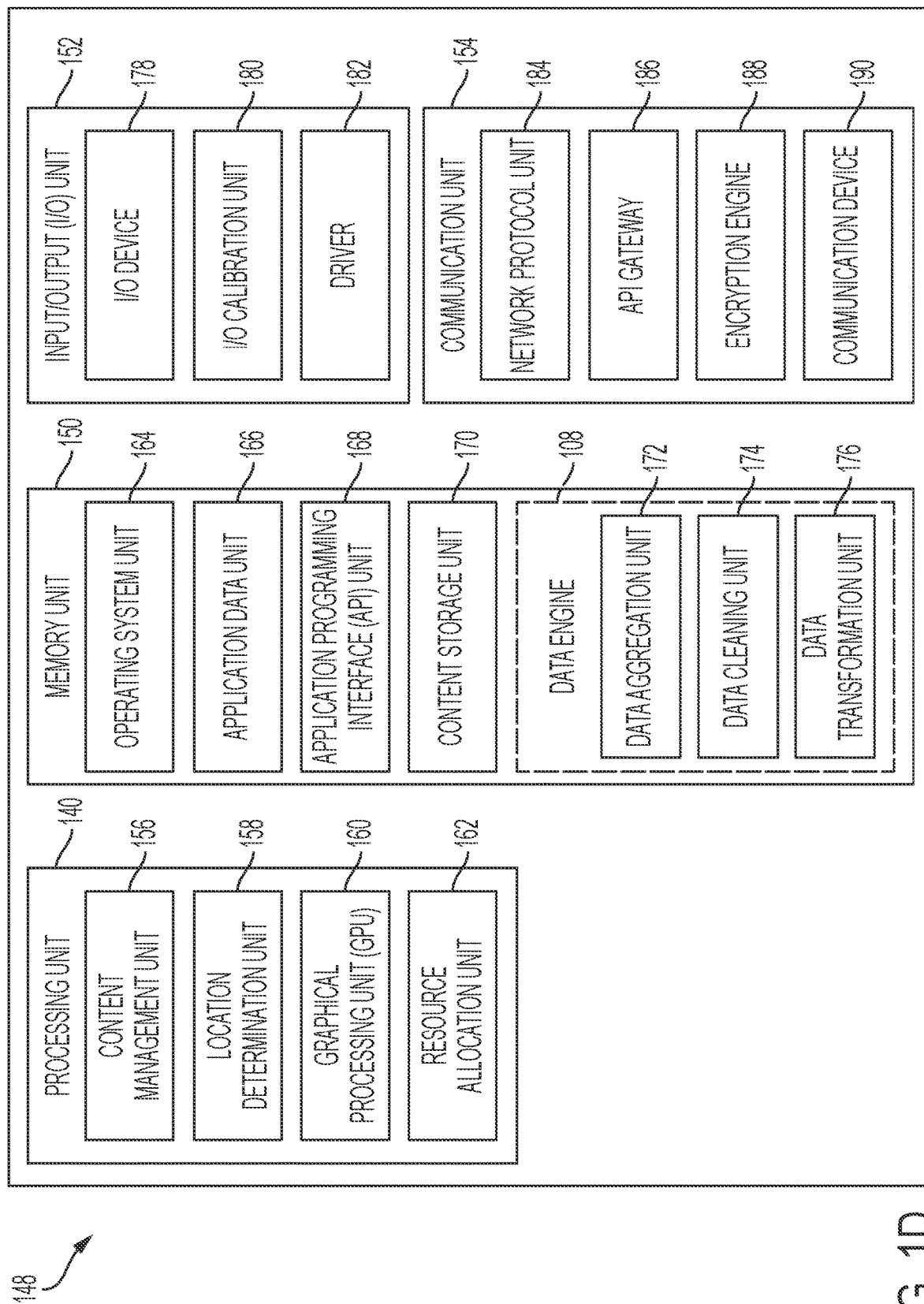
FIG. 1D is a functional block diagram of a computing environment, in accordance with some embodiments of this disclosure.

FIG. 1D illustrates an exemplary functional diagram of a computing environment 148, according to some embodiments of this disclosure, for performing the operations described herein. It is appreciated that the computing environment 148 may be implemented in one or more elements of the data management architecture 100, such as the data storage system 106, the data management server 104, the data sources 120a . . . 120n, the network 118, or the repositories 112a . . . 112n. As seen in FIG. 1D, the computing environment 148 may include a processing unit 140, a memory unit 150, an I/O unit 152, and a communication unit 154. The processing unit 140, the memory unit 150, the I/O unit 152, and the communication unit 154 may include one or more subunits for performing operations described herein. Additionally, each unit and/or subunit may be operatively and/or otherwise communicatively coupled with each other to facilitate the operations described herein. The computing environment 148 including any of its units and/or subunits may include general hardware, specifically purposed hardware, and/or software.

The processing unit 140 of the computing environment 148 may control one or more of the memory units 150, the I/O unit 152, and the communication unit 154, as well as any included subunits, elements, components, devices, and/or functions performed by the memory unit 150, I/O unit 152, and the communication unit 154. The described sub-elements of the computing environment 148 may also be included in similar fashion in any of the other units and/or devices included in the data management architecture 100 of FIG. 1A. Additionally, any actions described herein as being performed by a processor may be taken by the processing unit 140 of FIG. 1D alone and/or by the processing unit 140 in conjunction with one or more additional processors, units, subunits, elements, components, devices, and/or the like. Further, while one processing unit 140 may be shown in FIG. 1D, multiple processing units may be present and/or otherwise included in the computing environment 148 or elsewhere in the overall data management architecture 100 of FIG. 1A. Thus, while instructions may be described as being executed by the processing unit 140 and/or various subunits of the processing unit 140, the instructions may be executed simultaneously, serially, and/or otherwise by one or multiple processing units 140 on one or more devices.

In some embodiments, the processing unit 140 may be implemented as one or more computer processing unit (CPU) chips and/or graphical processing unit (GPU) chips and may include a hardware device capable of executing computer instructions. The processing unit 140 may execute instructions, codes, computer programs, and/or scripts. The instructions, codes, computer programs, and/or scripts may be received from and/or stored in the memory unit 150, the I/O unit 152, the communication unit 154, subunits, and/or elements of the aforementioned units, other devices, and/or computing environments, and/or the like.

In some embodiments, the processing unit 140 may include, among other elements, subunits such as a content management unit 156, a location determination unit 158, a graphical processing unit (GPU) 160, and a resource allocation unit 162. Each of the aforementioned subunits of the processing unit 140 may be communicatively and/or otherwise operably coupled with each other.

The content management unit 156 may facilitate generation, modification, analysis, transmission, and/or presentation of content. Content may be file content, media content, or any combination thereof. In some instances, content on which the content management unit 156 may operate includes device information, user interface data, images, text, themes, audio files, video files, documents, data from the one or more data sources 120*a* . . . 120*n*, etc. Additionally, the content management unit 156 may control the audio-visual environment and/or appearance of application data during execution of various processes. In some embodiments, the content management unit 156 may interface with other third-party content server and/or memory location for execution of its operations.

The location determination unit 158 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 158 may include various sensors, radar, and/or other specifically purposed hardware elements for the location determination unit 158 to acquire, measure, and/or otherwise transform location information.

The GPU 160 may facilitate generation, modification, analysis, processing, transmission, and/or presentation of content described above, as well as any data described herein. In some embodiments, the GPU 160 may be used to render content for presentation on a computing device via, for example, a web graphic user interface (GUI) or user portal associated with the data management system 102. The GPU 160 may also include multiple GPUs and therefore may be configured to perform and/or execute multiple processes in parallel. In some implementations, the GPU 160 may be used in conjunction with the data engine 108, and/or in conjunction with other subunits associated with the memory unit 150, the I/O unit 152, and the communication unit 154.

The resource allocation unit 162 may facilitate the determination, monitoring, analysis, and/or allocation of computing resources throughout the computing environment 148 and/or other computing environments. For example, the computing environment may facilitate a high volume of data (e.g., files and data from the one or more data sources 120*a* . . . 120*n* and or data from the data management system 102), to be processed and analyzed. As such, computing resources of the computing environment 148 used by the processing unit 140, the memory unit 150, the I/O unit 152, and/or the communication unit 154 (and/or any subunit of the aforementioned units) such as processing power, data storage space, network bandwidth, and/or the like may be in high demand at various times during operation. Accordingly, the resource allocation unit 162 may include sensors and/or other specially purposed hardware for monitoring performance of each unit and/or subunit of the computing environment 148, as well as hardware for responding to the computing resource needs of each unit and/or subunit. In some embodiments, the resource allocation unit 162 may use computing resources of a second computing environment separate and distinct from the computing environment 148 to facilitate a desired operation.

For example, the resource allocation unit 162 may determine a number of simultaneous computing processes and/or requests. The resource allocation unit 162 may also determine that the number of simultaneous computing processes and/or requests meets and/or exceeds a predetermined threshold value. Based on this determination, the resource allocation unit 162 may determine an amount of additional computing resources (e.g., processing power, storage space of a particular non-transitory computer-readable memory medium, network bandwidth, and/or the like) required by the processing unit 140, the memory unit 150, the I/O unit 152, the communication unit 154, and/or any subunit of the aforementioned units for safe and efficient operation of the computing environment while supporting the number of simultaneous computing processes and/or requests. The resource allocation unit 162 may then retrieve, transmit, control, allocate, and/or otherwise distribute determined amount(s) of computing resources to each element (e.g., unit and/or subunit) of the computing environment 148 and/or another computing environment.

In some embodiments, factors affecting the allocation of computing resources by the resource allocation unit 162 may include the number of computing processes and/or requests, a duration of time during which computing resources are required by one or more elements of the computing environment 148, and/or the like. In some implementations, computing resources may be allocated to and/or distributed amongst a plurality of second computing environments included in the computing environment 148 based on one or more factors mentioned above. In some embodiments, the allocation of computing resources of the resource allocation unit 162 may include the resource allocation unit 162 flipping a logic switch, adjusting processing power, adjusting memory size, partitioning a memory element, transmitting data, controlling one or more input and/or output devices, modifying various communication protocols, and/or the like. In some embodiments, the resource allocation unit 162 may facilitate utilization of parallel processing techniques such as dedicating a plurality of GPUs included in the processing unit 140 for running a multitude of processes.

The memory unit 150 may be used for storing, recalling, receiving, transmitting, and/or accessing various files and/or data (e.g., the aforementioned data from the data sources 120*a* . . . 120*n*) during operation of computing environment 148. For example, memory unit 150 may be utilized for storing, recalling, and/or updating data associated with, resulting from, and/or generated by any unit, or a combination of units and/or subunits of the computing environment 148. In some embodiments, the memory unit 150 may store instructions, code, and/or data that may be executed by the processing unit 140. For instance, the memory unit 150 may store code that execute operations associated with one or more units and/or one or more subunits of the computing environment 148. For example, the memory unit may store code for the processing unit 140, the I/O unit 152, the communication unit 154, and for itself. In some embodiments, the memory unit may store a specialized database and/or an application programming interface (API) database comprising information (e.g., associated with object-based data or object-related data or object-oriented data and/or content-related data and/or measured data and/or the like) that may be accessed and/or used by applications, units, elements, and/or operating systems of computing devices and/or computing environment 148. In some embodiments, each API database may be associated with a customized physical circuit included in the memory unit 150 and/or the API unit 168. Additionally, each API database may be public and/or private, and so authentication credentials associated with one or more access protocols may be required to access information in the API database.

The memory unit 150 may include various types of data storage media such as solid-state storage media, hard disk storage media, virtual storage media, and/or the like. The memory unit 150 may include dedicated hardware elements such as hard drives and/or servers, as well as software elements such as cloud-based storage drives. In some implementations, the memory unit 150 may comprise one or more of a random-access memory (RAM) device, a dynamic random-access memory (DRAM) device, a static random-access memory (SRAM) device, flash memory, read only memory (ROM) device, and/or various forms of secondary storage. The RAM device may be used to store volatile data and/or to store instructions that may be executed by the processing unit 140. For example, the instructions stored by the RAM device may be a command, a current operating state of computing environment 148, an intended operating state of computing environment 148, and/or the like. As a further example, data stored in the RAM device of the memory unit 150 may include instructions related to various methods and/or functionalities described herein. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 150 may include one or more databases (e.g., a database associated with one or more repository 112a . . . 112n) for storing any data described herein. Additionally or alternatively, one or more secondary databases (e.g., the one or more repository 112a . . . 112n discussed with reference to FIG. 1A) located remotely from computing environment 148 may be used and/or accessed by the memory unit 150.

Turning back to FIG. 1D, the memory unit 150 may include subunits such as an operating system unit 164, an application data unit 166, an application programming interface 168, a content storage unit 170, data engine 108, and a cache storage unit (not shown). Each of the aforementioned subunits of the memory unit 150 may be communicatively and/or otherwise operably coupled with each other and other units and/or subunits of the computing environment 148. It is also noted that the memory unit 150 may include other modules, instructions, or code that facilitate the execution of the techniques described herein. For instance, the memory unit 150 may include one or more modules such as a receiving module, a mapping module, a determining module, a sequencing module, a quantifying module, a resolving module, a parsing module, a visualization module, etc., that comprise instructions executable by one or more computing device processors to accomplish one or more operations provided in this disclosure.

The operating system unit 164 may facilitate deployment, storage, access, execution, and/or utilization of an operating system used by computing environment 148 and/or any other computing environment described herein. In some embodiments, operating system unit 164 may include various hardware and/or software elements that serve as a structural framework for processing unit 140 to execute various operations described herein. Operating system unit 164 may further store various pieces of information and/or data associated with the operation of the operating system and/or computing environment 148 as a whole, such as a status of computing resources (e.g., processing power, memory availability, resource utilization, and/or the like), runtime information, modules to direct execution of operations described herein, user permissions, security credentials, and/or the like.

The application data unit 166 may facilitate deployment, storage, access, execution, and/or utilization of an application and/or data used by computing environment 148 and/or any other computing environment described herein. For example, the application data unit 166 may store any information and/or data associated with an application. Application data unit 166 may further store various pieces of information and/or data associated with the operation of an application and/or computing environment 148 as a whole, such as a status of computing resources (e.g., processing power, memory availability, resource utilization, and/or the like), runtime information, user interfaces, modules to direct execution of operations described herein, user permissions, security credentials, access and processing of data stored in the data management system 102, and/or the like.

The application programming interface (API) unit 168 may facilitate deployment, storage, access, execution, and/or use of information associated with APIs of computing environment 148 and/or any other computing environment described herein. For example, computing environment 148 may include one or more APIs for various devices, applications, units, subunits, elements, and/or other computing environments to communicate with each other and/or use the same data. Accordingly, API unit 168 may be associated with or otherwise include API databases (e.g., stored in the one or more repositories 112a . . . 112n) containing information that may be accessed and/or used by applications, units, subunits, elements, and/or operating systems of other devices and/or computing environments. As previously discussed, each API database may be associated with a customized physical circuit included in memory unit 150 and/or API unit 168. Additionally, each API database may be public and/or private, and so authentication credentials may be required to access information in an API database. In some embodiments, the API unit 168 may facilitate communication between the data management system 102 and one or more client applications 116.

The content storage unit 170 may facilitate deployment, storage, access, and/or use of information associated with performance of various operations discussed herein. In some embodiments, content storage unit 170 may communicate with content management unit 156 to receive and/or transmit content files (e.g., media content and other data from the data source 120a . . . 120n).

Data engine 108 may include at least a data aggregation unit 172, a data cleaning unit 174, and a data transformation unit 176. According to some embodiments, the data engine 108 may include instructions that facilitate receiving data from a plurality of sources, aggregating the data in a specialized data structure that facilitates efficient real-time execution of diligence and/or reconciliation operations to transform the received and aggregated data and thereby generate a report indicative of whether there are one or more inconsistencies and/or validation issues associated with the aggregated data. In some implementations, the diligence and/or reconciliation operations may include automatic real-time operations that execute one or more checks or queries on the aggregated data to determine whether the aggregated data is accurate. It is appreciated that the data engine may comprise multiple engines such that there is at least one engine for data ingestion and data export. In particular, the data engine may comprise one or more engines such that each engine comprised in the one or more engines may include multiple units such as the data aggregation unit 172, the data cleaning unit 174, etc.

The cache storage unit (not shown) of the memory unit 150 may facilitate short-term deployment, storage, access, analysis, and/or utilization of data (e.g., data from the one or more data sources 120a . . . 120n). In some embodiments, the cache storage unit may serve as a short-term storage location for data so that the data stored in cache storage unit may be accessed quickly. In some instances, the cache storage unit may include RAM devices and/or other storage media types for quick recall of stored data. The cache storage unit may include a partitioned portion of storage media included in memory unit 150.

The I/O unit 152 may include hardware and/or software elements for the computing environment 148 to receive, transmit, and/or present information useful for performing diligence and/or reconciliation operations and/or other processes described herein. As described herein, I/O unit 152 may include subunits such as an I/O device 178, an I/O calibration unit 180, and/or driver 182.

The I/O device 178 may facilitate receipt, transmission, processing, presentation, display, input, and/or output of information as a result of executed processes described herein. In some embodiments, the I/O device 178 may include a plurality of I/O devices. In some embodiments, the I/O device 178 may include a variety of elements that enable a user to interface with computing environment 148. For example, the I/O device 178 may include a keyboard, a touchscreen, a button, a sensor, a biometric scanner, a laser, a microphone, a camera, and/or another element for receiving and/or collecting input from a user. Additionally and/or alternatively, the I/O device 178 may include a display, a screen, a sensor, a vibration mechanism, a light emitting diode (LED), a speaker, a radio frequency identification (RFID) scanner, and/or another element for presenting and/or otherwise outputting data to a user.

The I/O calibration unit 180 may facilitate the calibration of the I/O device 178. For example, the I/O calibration unit 180 may detect and/or determine one or more settings of the I/O device 178, and then adjust or otherwise modify settings so that the I/O device 178 may operate more efficiently.

In some embodiments, the I/O calibration unit 180 may use a driver 182 (or multiple drivers) to calibrate the I/O device 178. For example, the driver 182 may include software that is to be installed by the I/O calibration unit 180 so that an element of the computing environment 148 (or an element of another computing environment) may recognize and/or integrate with the I/O device 178 for the operations described herein.

The communication unit 154 may facilitate establishment, maintenance, monitoring, and/or termination of communications between the computing environment 148 and other computing environments, third party server systems, and/or the like (e.g., between the data management system 102, the client applications 116, and/or the data sources 120a . . . 120n). The communication unit 154 may also facilitate internal communications between various elements (e.g., units and/or subunits) of the computing environment 148. In some embodiments, the communication unit 154 may include a network protocol unit 184, an API gateway 186, an encryption engine 188, and/or a communication device 190. The communication unit 154 may include hardware and/or software elements.

The network protocol unit 184 may facilitate establishment, maintenance, and/or termination of a communication connection for the computing environment 148 by way of a network (e.g., network 118). For example, the network protocol unit 184 may detect and/or define a communication protocol required by a particular network and/or network type. Communication protocols used by the network protocol unit 184 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for the computing environment 148 may include transforming and/or translating data from being compatible with a first communication protocol to being compatible with a second communication protocol. In some embodiments, the network protocol unit 184 may determine and/or monitor an amount of data traffic to consequently determine which particular network protocol may be used for establishing a secure communication connection, transmitting data, and/or performing operations and/or processes described herein.

The application programming interface (API) gateway 186 may allow other devices and/or computing environments to access the API unit 168 of the memory unit 150 of the computing environment 148. For example, a client application 116 may access the API unit 168 of the computing environment 148 via the API gateway 186. In some embodiments, the API gateway 186 may be required to validate user credentials associated with a user (e.g., stakeholder) of the client application 116 prior to providing access to the API unit 168 to a user. The API gateway 186 may include instructions for the computing environment 148 to communicate with another device and/or between elements of the computing environment 148.

The encryption engine 188 may facilitate translation, encryption, encoding, decryption, and/or decoding of information received, transmitted, and/or stored by the computing environment 148. Using the encryption engine 188, each transmission of data may be encrypted, encoded, and/or translated for security reasons, and any received data may be encrypted, encoded, and/or translated prior to its processing and/or storage. In some embodiments, the encryption engine 188 may generate an encryption key, an encoding key, a translation key, and/or the like, which may be transmitted along with any data content.

The communication device 190 may include a variety of hardware and/or software specifically purposed to facilitate communication for the computing environment 148. In some embodiments, the communication device 190 may include one or more radio transceivers, chips, analog front end (AFE) units, antennas, processing units, memory, other logic, and/or other components to implement communication protocols (wired or wireless) and related functionality for facilitating communication for the computing environment 148. Additionally and/or alternatively, the communication device 190 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

Figure 2:
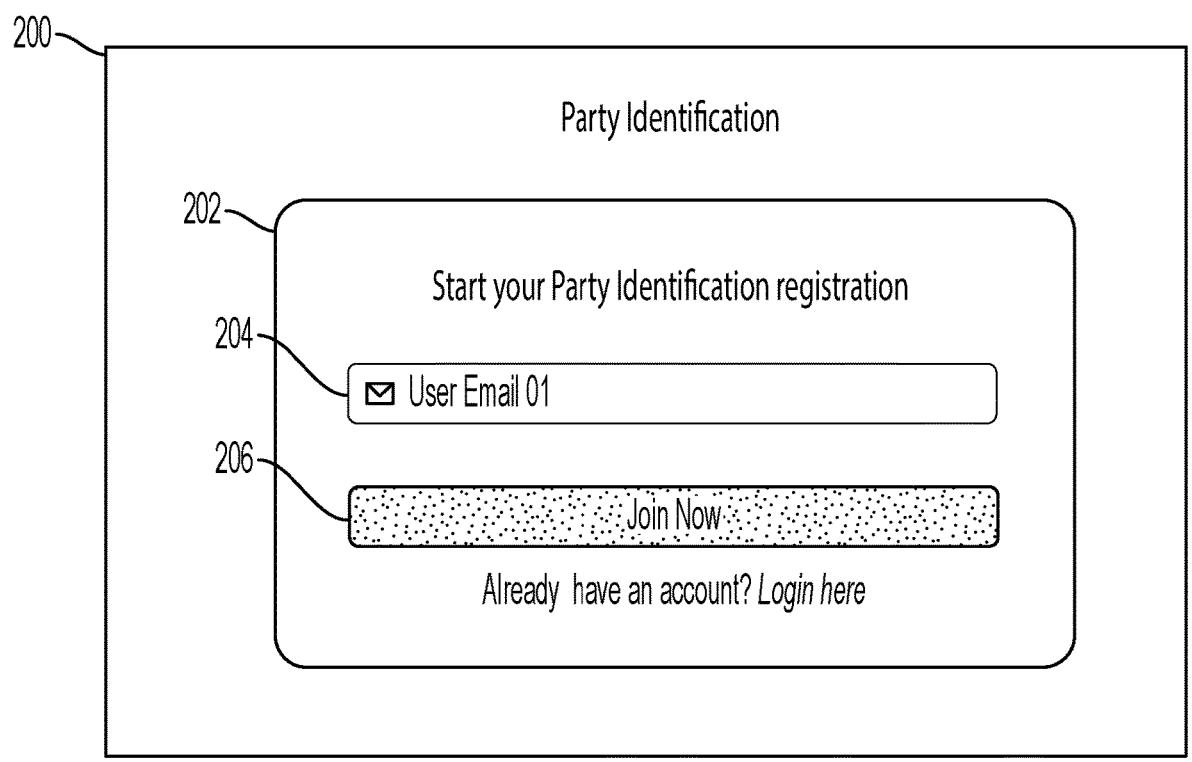
FIG. 2 shows a potential embodiment of a user interface on an endpoint (or computing) device associated with the registration to a multisystem network.

FIG. 2 shows a potential embodiment of a registration screen 200 on a first computing device (e.g., 114) for a user to register a digital profile. The registration screen 200 may comprise a first registration pop-up window 202, a submission field 204 for a user to input identification information, and a selectable object for the user to continue to the next step in the registration process. In some embodiments, the digital profile may comprise a universal account login. In some embodiments, the submission field 204 may comprise fill-in-the-blank, checkboxes, dropdown menus, or other information gathering features. In some embodiments, identification information may comprise an email address, name, address, login information, etc.

Figure 3:
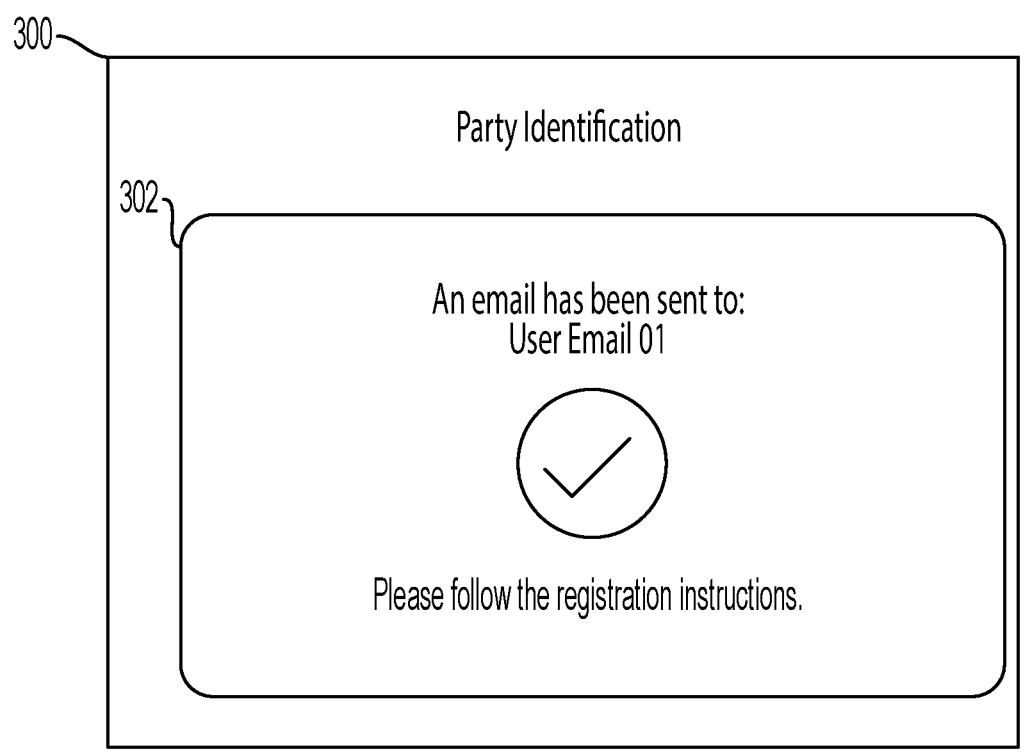
FIG. 3 shows a second potential embodiment of a user interface on an endpoint (or computing) device associated with the registration to a multisystem network.

FIG. 3 show a potential embodiment of a confirmation interface screen 300 on a first computing device (e.g., 114) associated with a registration process. The confirmation user interface screen 300 may comprise a pop-up confirmation window 302, wherein the pop-up confirmation window 302 may comprise a notice that a confirmation message was sent to a user point of contact. In some embodiments, the user point of contact may comprise an email address, phone number, mailing address, etc.

Figure 4:
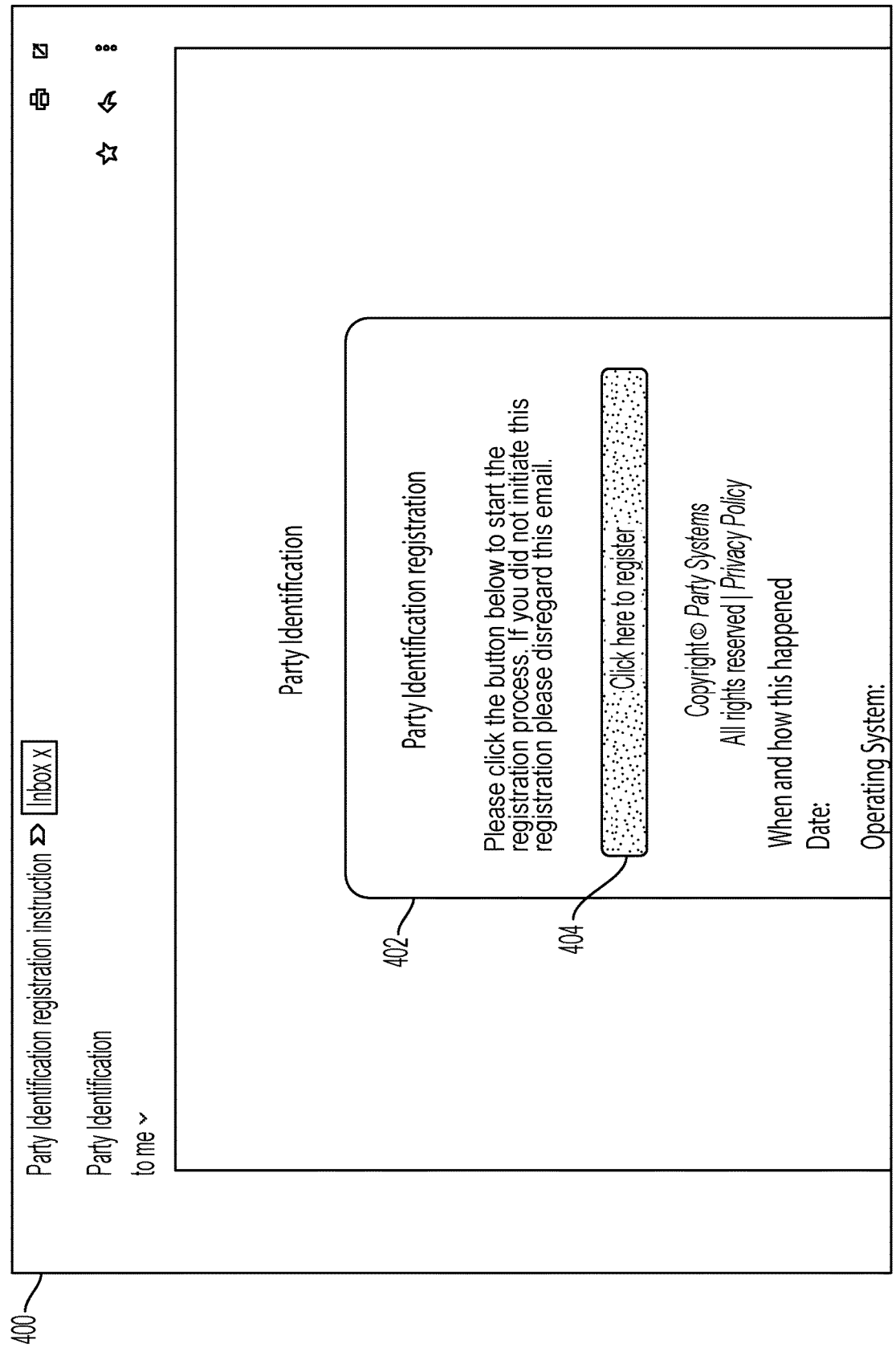
FIG. 4 shows a third potential embodiment of a user interface on an endpoint (or computing) device associated with the registration to a multisystem network.

FIG. 4 shows a user interface screen 400 associated with a confirmation message. The user interface screen 400 associated with a confirmation message may comprise an informational message 402 requesting user confirmation of identification data. The user interface screen 400 associated with a confirmation message may also comprise a selectable object 404 to confirm the accuracy of identification data associated with the user. In some embodiments, the selectable object 404 may comprise a hyperlink, selectable redirection icon, pre-compiled API, etc.

Figure 5:
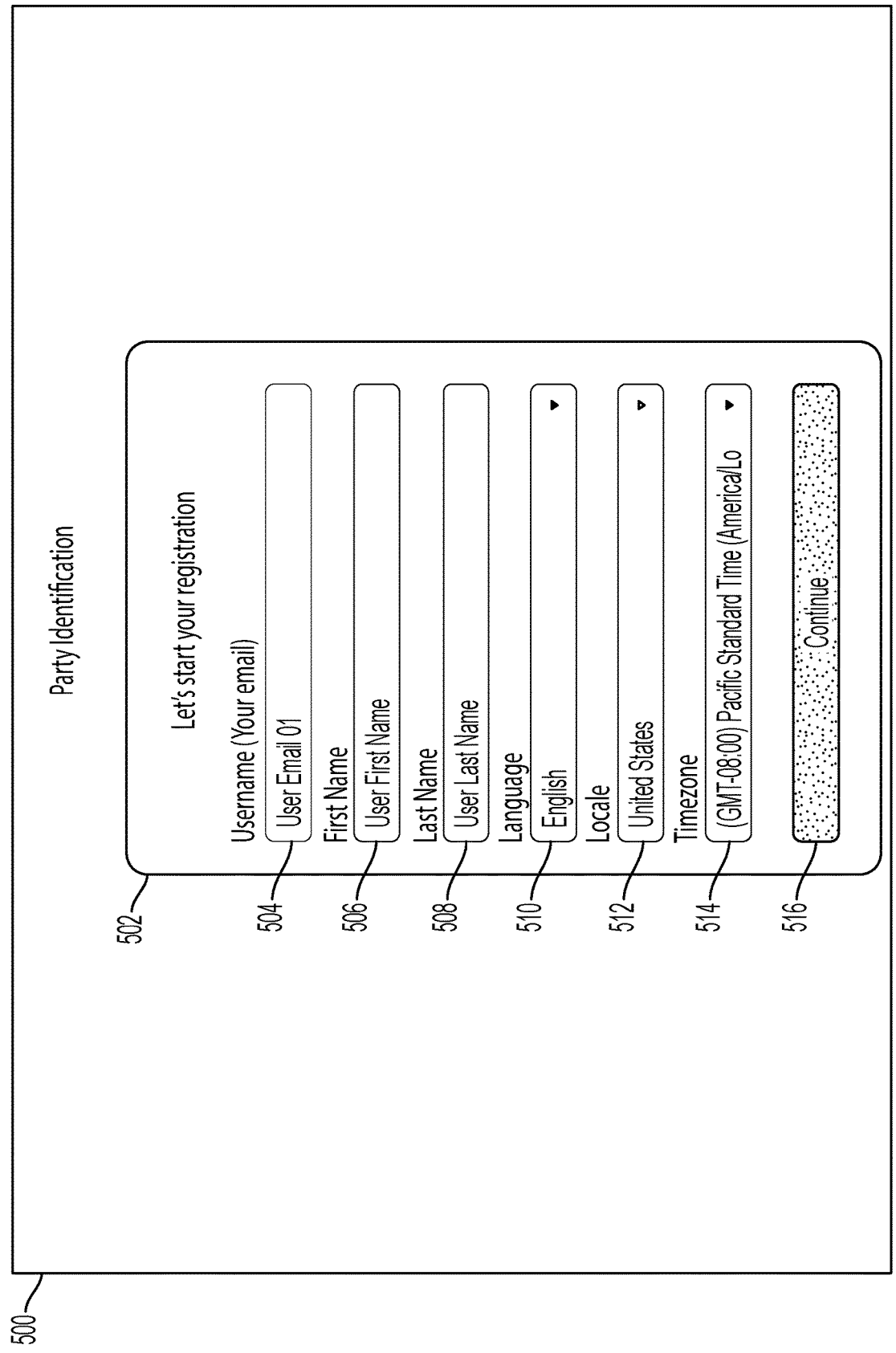
FIG. 5 shows a fourth potential embodiment of a user interface on an endpoint (or computing) device associated with the registration to a multisystem network.

FIG. 5 shows a second potential embodiment of a registration screen 500 on a first computing device (e.g., 114). The second potential embodiment of a registration screen 500 may comprise a registration popup window 502, a username submission field 504, a first name submission field 506, a last name submission field 508, a language submission field 510, a locale submission field 512, and a time zone submission field 514. The second potential embodiment of a registration screen 500 may also comprise a continuation selectable object 516. In some embodiments, the continuation selectable object 516 comprises a hyperlink, selectable icon, pre-compiled API, etc.

Figure 6:
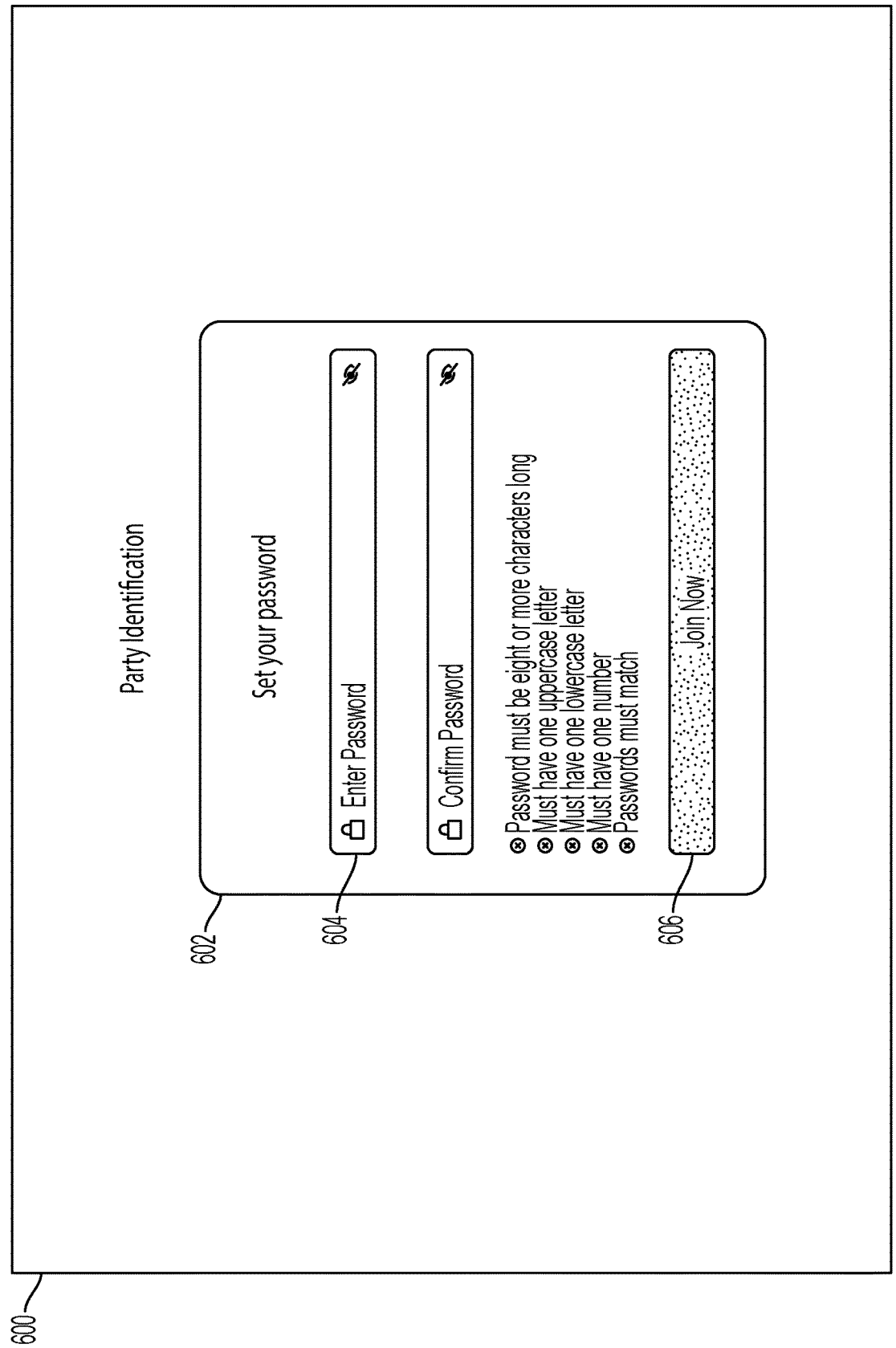
FIG. 6 shows a fifth potential embodiment of a user interface on an endpoint (or computing) device associated with the registration to a multisystem network.

FIG. 6 shows a third potential embodiment of a registration screen 600 on a first computing device (e.g., 114). The third potential embodiment of a registration screen 600 may comprise an authentication key request pop-up window 602, an authentication key submission field 604, and a second continuation selectable object 606. In some embodiments, the authentication key submission field 604 may comprise fill-in-the-blank, checkboxes, dropdown menus, or other information gathering features. In some embodiments, the second continuation selectable object 606 comprises a hyperlink, selectable icon, pre-compiled API, etc. In some embodiments the authentication key that the user enters into the authentication key submission field 604 meets one or more security requirements. In some embodiments, the security requirements may comprise string length requirements and character variation requirements. In some embodiments, the security requirements may comprise a method or a system within the multisystem network that cross-references an internal or third-party database of compromised authentication keys and rejects any proposed authentication keys that have been identified on the internal or third-party database as being compromised. In some embodiments, the security requirements may comprise a method or system within the multisystem network for detecting reused authentication keys within the multisystem network and rejects the reused authentication keys.

Figure 7A:
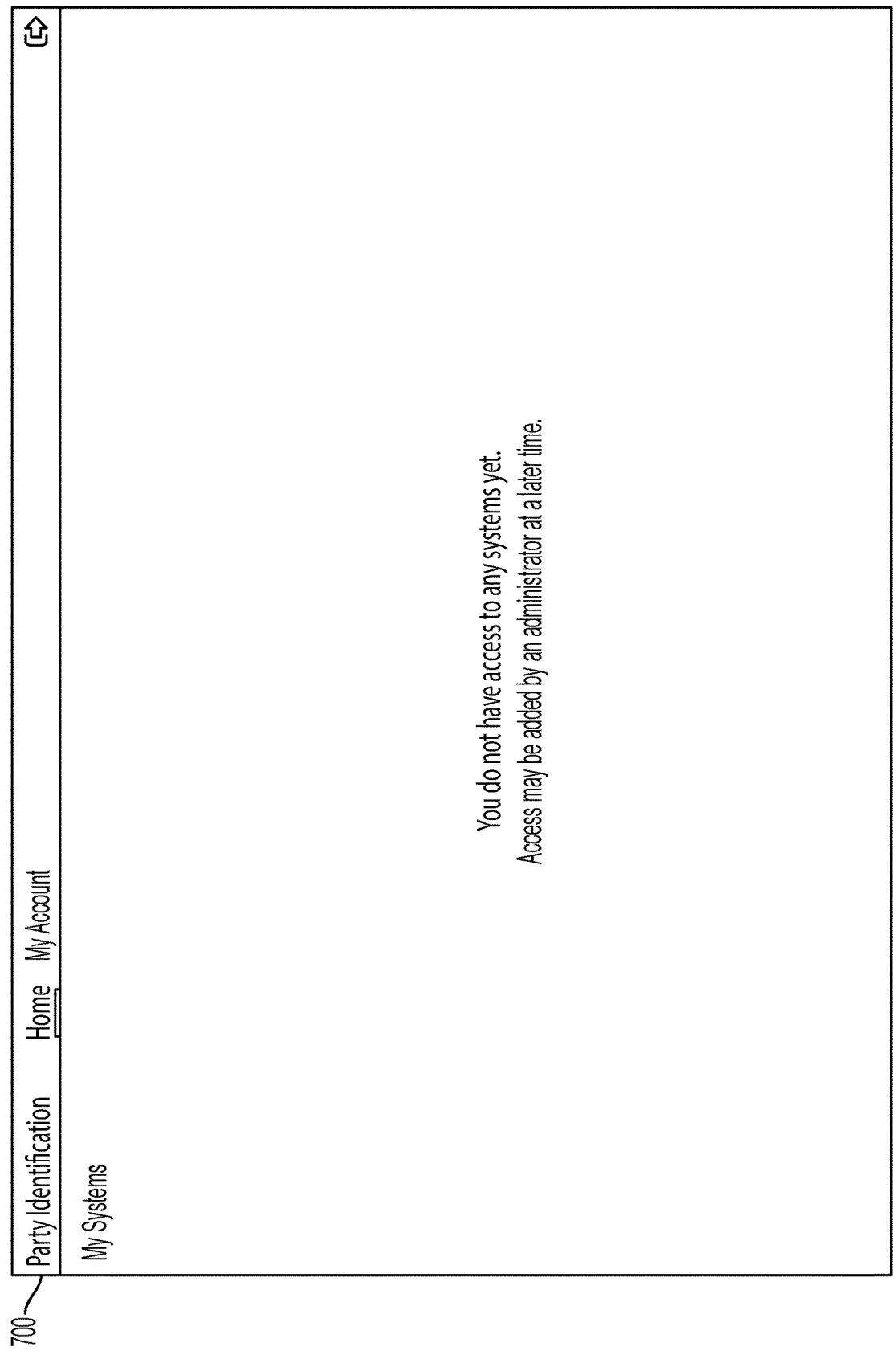

FIG. 7A-7B shows potential embodiments of a multisystem network user interface screen 700 and 750 on a first computing device (e.g., 114). As shown in FIG. 7B, the multisystem network user interface screen may comprise a search function 752, one or more system names 754, one or more organization names 756, one or more system login records 758, and one or more organization identifiers 760. In some embodiments, the search function 752 may comprise a submission field or selectable object to locate terms, characters, and files within the multisystem network. In some embodiments, the one or more system names 754 comprise the names of relevant software programs. In some embodiments, the one or more organization names 756 comprise the names of software publishers and managers. In some embodiments, the one or more system login records 758 comprise time intervals since the user last interacted with each specific software program. In some embodiments, the one or more organization identifiers comprise organizational uniform resource locators, abbreviated or alternate names, organizational logos, or any other form of visual representation associated with each organization. In some embodiments, the one or more system names 754, one or more organization names 756, one or more system login records 758, and one or more organization identifiers 760 comprise selectable objects, wherein the selectable objects may direct the user to associated user interfaces or files. In some embodiments, the multisystem username and authentication key comprise a personal identity managed by operators of the multisystem network, wherein the multisystem network and its operators are identity providers. In some embodiments, the personal identity makes it easy for users to access multiple systems in the multisystem network with one username and authentication key. In some embodiments, the username is in the form of a validated email address that matches the validated email address. In some embodiments, the personal identity is owned by the multisystem operators and system operators. In some embodiments, employers of the users may also own the personal identity of users. In some embodiments, a user will not be able to reset authentication keys or get notifications from the multisystem network if the user loses access the validated email address. In some embodiments, if a user has multiple employers, the user may have multiple personal identities.

Figure 8:
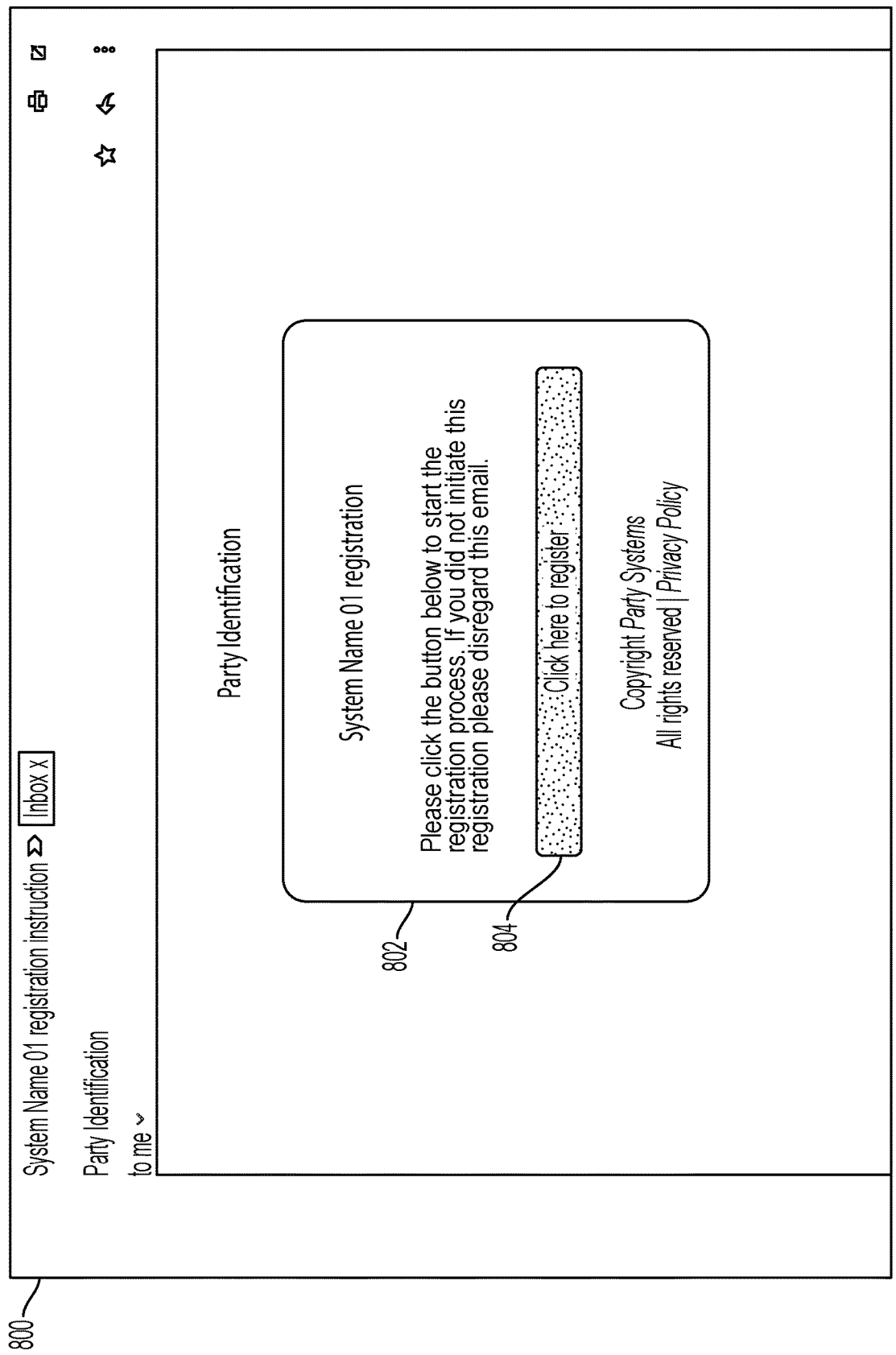
FIG. 8 shows a sixth potential embodiment of a user interface on an endpoint (or computing) device associated with the registration to a multisystem network.

FIG. 8 shows a second user interface screen 800 associated with a confirmation message. The second user interface screen 800 associated with a confirmation message may comprise an informational system message 802 requesting user confirmation of identification data. The second user interface screen 800 associated with a confirmation message may also comprise a selectable object 804 to confirm the accuracy of identification data associated with the user. In some embodiments, the selectable object 804 may comprise a hyperlink, selectable icon, pre-compiled API, etc. In some embodiments, the informational system message 802 is associated with authentication for a specific system. In some embodiments, a system user may initiate the registration process by inputting user identification data on the user's behalf. In some embodiments, a third-party may initiate the registration process for a user to gain access to the multisystem network by inputting a potential user's email address or other contact information and submitting it for validation by the user. In some embodiments, a multisystem network operator or one or more systems within the multisystem network may initiate the registration process for a potential user to gain access to the multisystem network by inputting the potential user's email address or other contact information and submitting the information for validation by the user.

Figure 9:
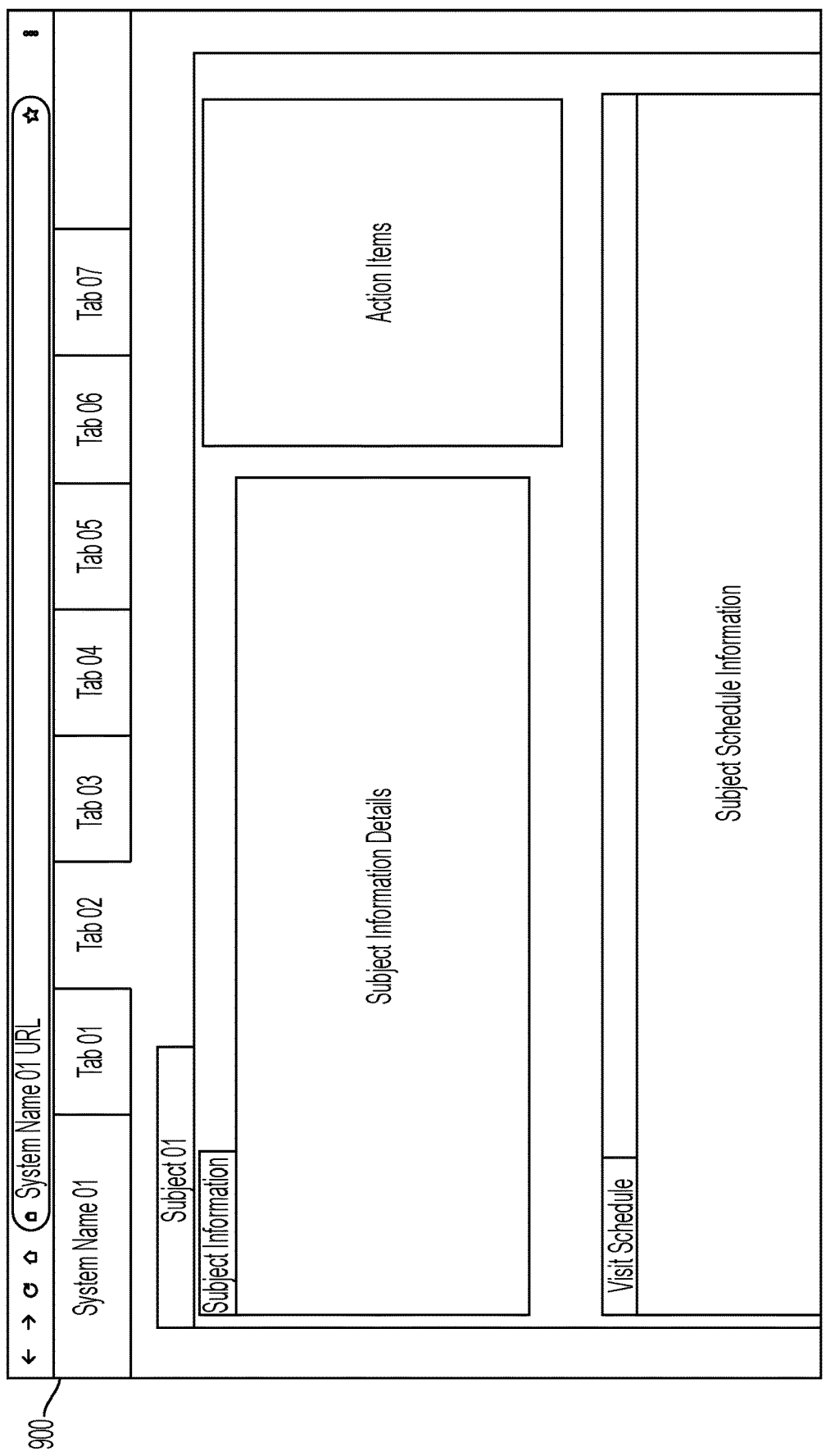
FIG. 9 shows a potential embodiment of a third-party user interface associated with a multisystem network on an endpoint (or computing) device for interaction by users.

FIG. 9 shows a potential embodiment of a system user interface screen 900 on a first computing device (e.g., 114). In some embodiments, the system user interface 900 comprises a third-party user interface. In some embodiments, the system user interface 900 comprises a user interface of another application that is associated with the multisystem network.

This application is a continuation of U.S. application Ser. No. 18/531,546, filed on Dec. 6, 2023, the disclosure of which is incorporated herein by reference in its entirety for all purposes.

Figure 10:
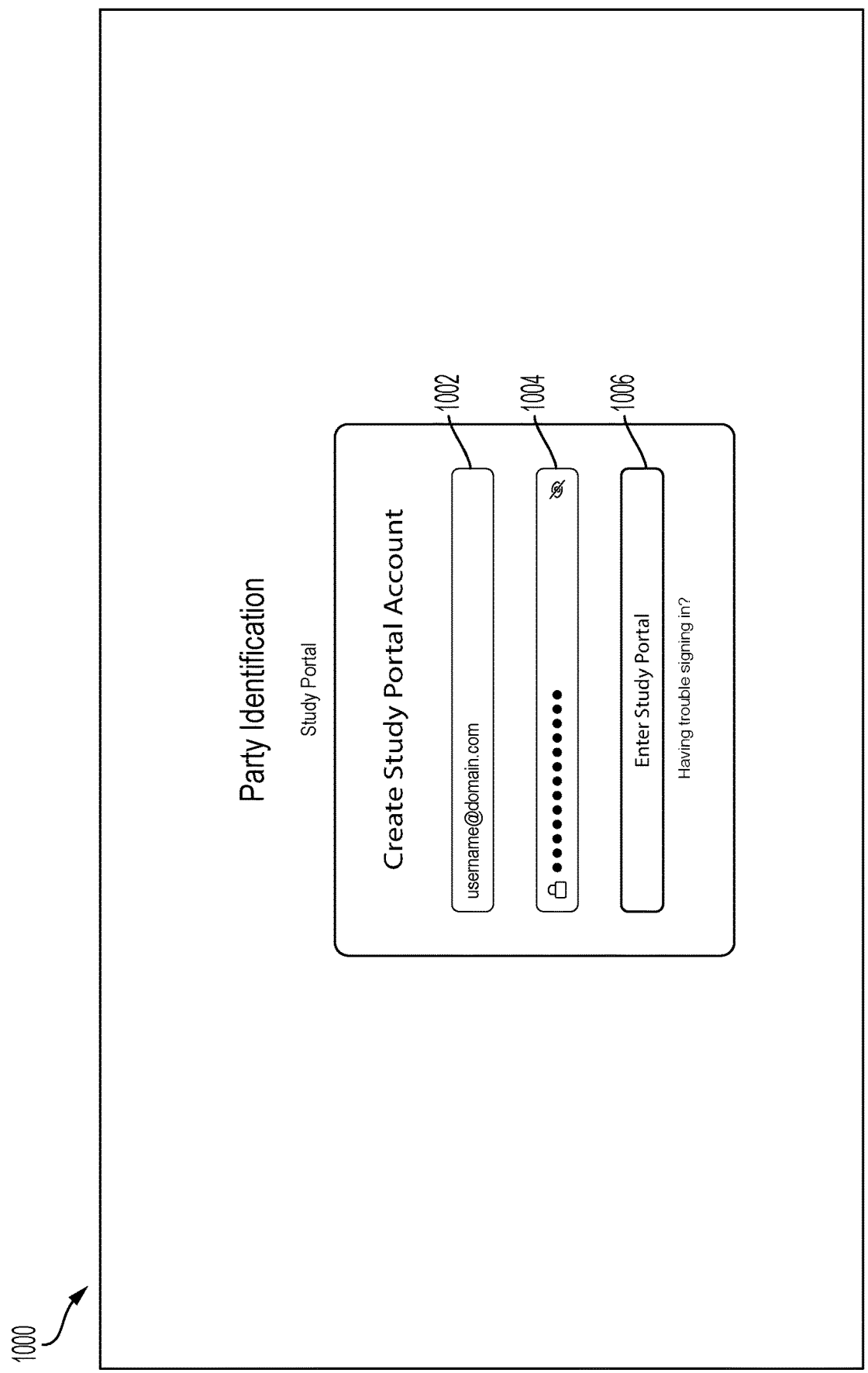
FIG. 10 shows a third potential embodiment of a user interface associated with a multisystem network on an endpoint (or computing) device for interaction by users.

FIG. 10 shows a potential embodiment of a third multisystem network user interface screen 1000 on a first computing device (e.g., 114). In some embodiments, the third multisystem network user interface screen 1000 may comprise a login screen with a username confirmation submission field 1002, an authentication key confirmation submission field 1004, and a third continuation selectable object 1006. In some embodiments, the username confirmation submission field 1002 and the authentication key confirmation submission field 1004 may comprise fill-in-the-blank, checkboxes, dropdown menus, or other information gathering features. In some embodiments, the third continuation selectable object 1006 comprises a hyperlink, selectable icon, pre-compiled API, etc.

Figure 11:
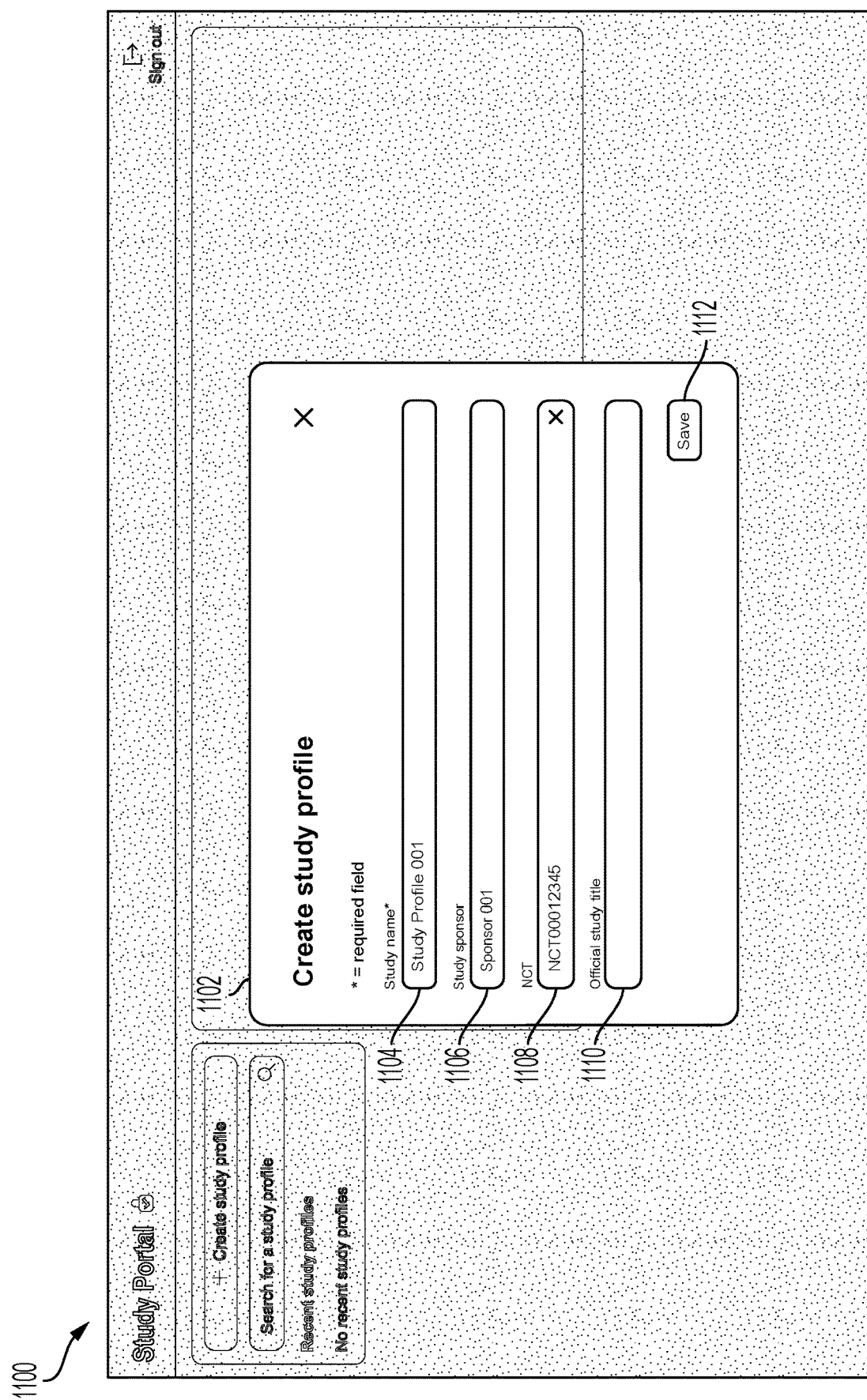
FIG. 11 shows a fourth potential embodiment of a user interface associated with a multisystem network on an endpoint (or computing) device for interaction by users.

FIG. 11 shows a potential embodiment of a fourth multisystem network user interface screen 1100 on a first computing device (e.g., 114). In some embodiments, the fourth multisystem network user interface screen 1100 may comprise a study creation pop-up window 1102. The study creation pop-up window 1102 may include a study name submission field 1104, a study sponsor submission field 1106, a national study number submission field 1108, a study title submission field 1110, and a confirmatory selectable object 1112.

Figure 12:
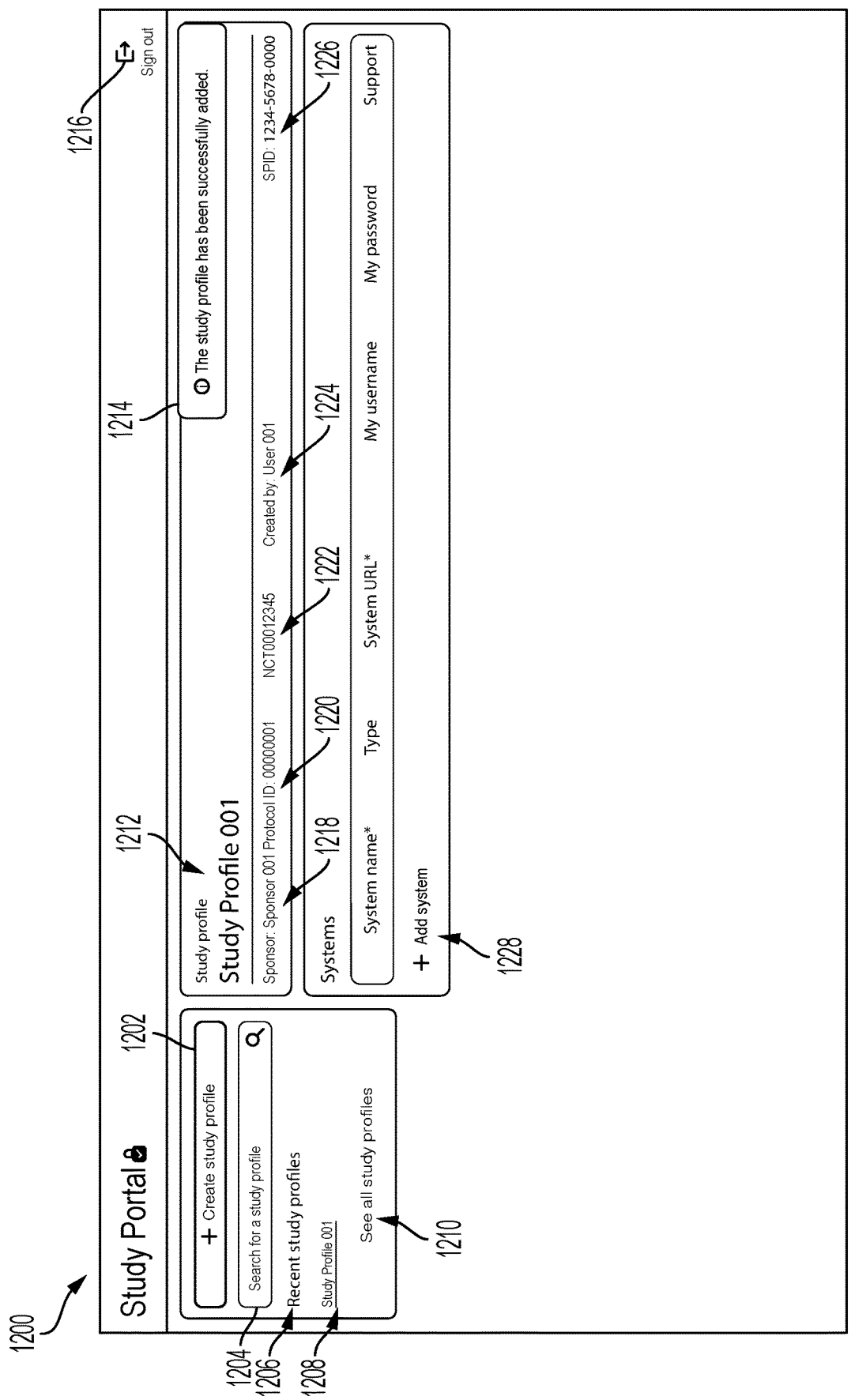
FIG. 12 shows a fifth potential embodiment of a user interface associated with a multisystem network on an endpoint (or computing) device for interaction by users.
Figure 13:
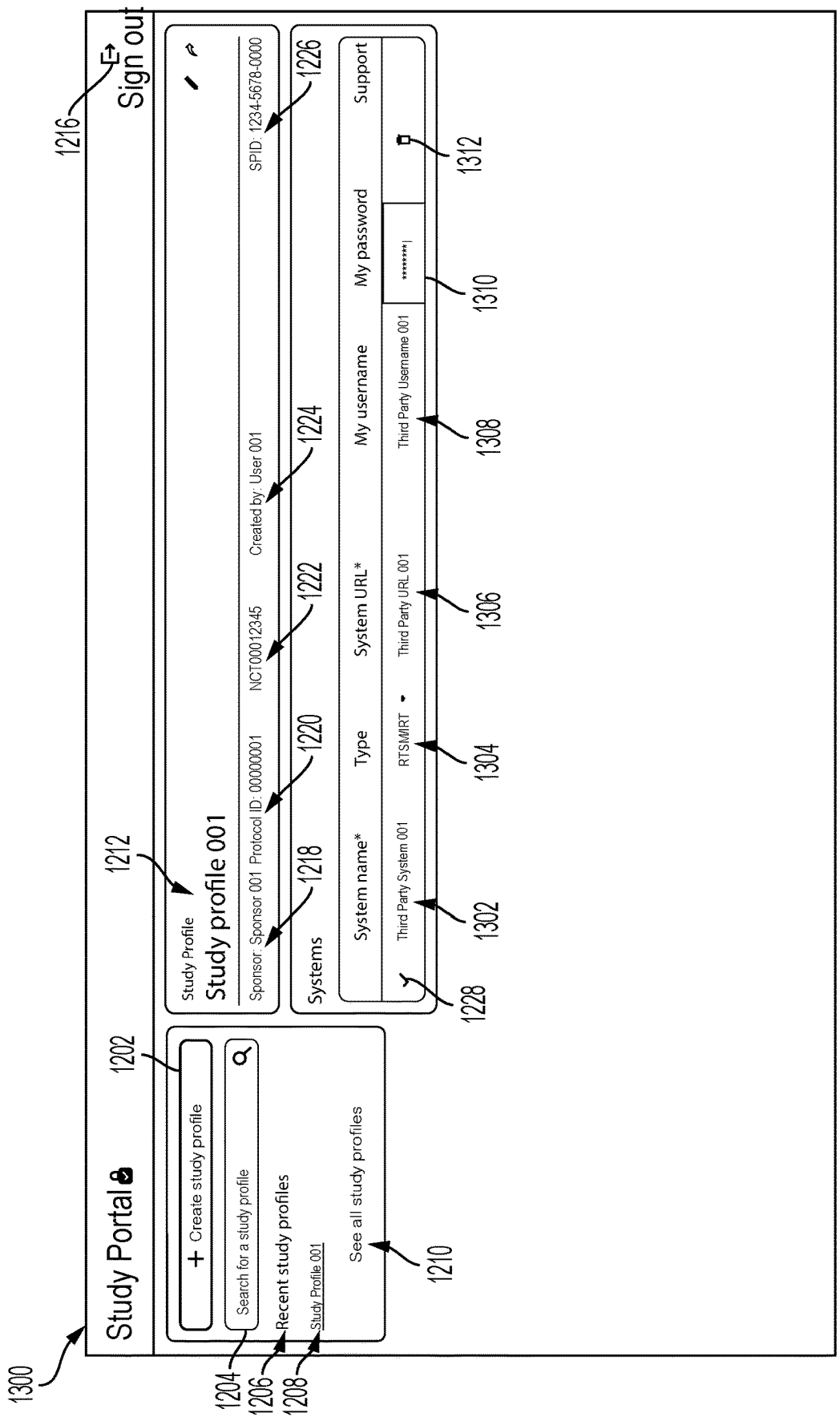
FIG. 13 shows a sixth potential embodiment of a user interface associated with a multisystem network on an endpoint (or computing) device for interaction by users.

FIG. 12 shows a potential embodiment of a fifth multisystem network user interface screen 1200 on a first computing device (e.g., 114). In some embodiments, the fifth multisystem network user interface screen 1200 may include a study creation selectable object 1202, a study search function 1204, a study list header 1206, a computing profile selectable object 1208, a study list selectable object 1210, a computing profile header 1212, a study creation confirmation message 1214, a user interface sign out selectable object 1216, a study sponsor indicator 1218, a study protocol indicator 1220, a national study number indicator 1222, a creator indicator 1224, a computing profile identification number 1226, and a system creation selectable object 1228. In some embodiments, the system creation selectable object 1228 allows a user to input system data into the user interface and associate system data to the computing profile, as shown in FIG. 13. In some embodiments, a computing profile may comprise a study profile.

FIG. 13 shows a potential embodiment of a sixth multisystem network user interface screen 1300 on a first computing device (e.g., 114). In some embodiments, the sixth multisystem network user interface screen 1300 may include a study creation selectable object 1202, a study search function 1204, a study list header 1206, a computing profile selectable object 1208, a study list selectable object 1210, a computing profile header 1212, a user interface sign out selectable object 1216, a study sponsor indicator 1218, a study protocol indicator 1220, a national study number indicator 1222, a creator indicator 1224, a computing profile identification number 1226, a system creation selectable object 1228, a system name indicator 1302, a system type indicator 1304, a system uniform resource locator indicator 1306, a system username indicator 1308, a system authentication key submission field 1310, and a system information deletion selectable icon 1312. In some embodiments, a submission field may take the place of the system name indicator 1302, the system type indicator 1304, the system uniform resource locator indicator 1306, and the system username indicator 1308. In some embodiments, a system authentication key indicator may take the place of the system authentication key submission field 1310.

Figure 14:
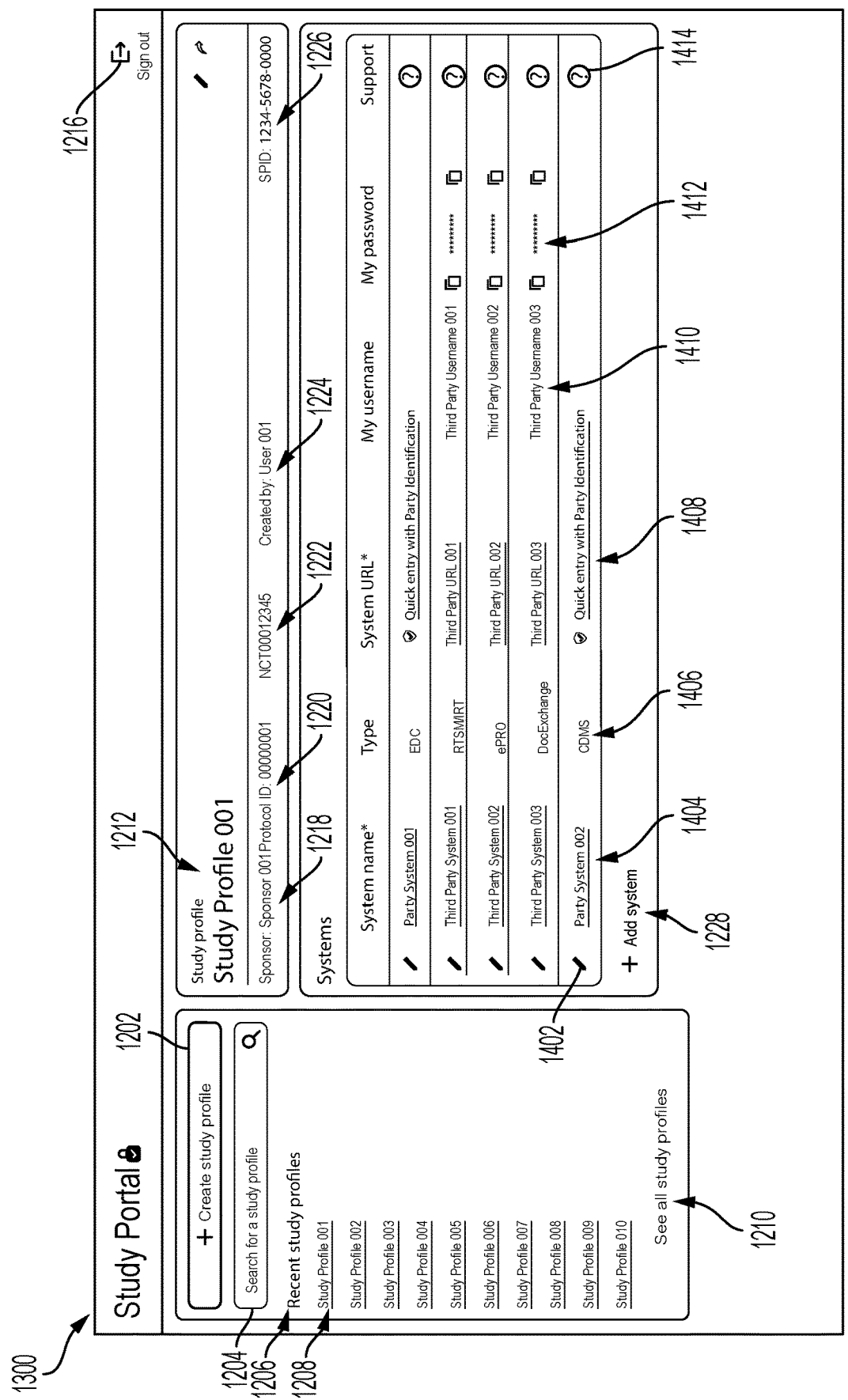
FIG. 14 shows a seventh potential embodiment of a user interface associated with a multisystem network on an endpoint (or computing) device for interaction by users.

FIG. 14 shows a potential embodiment of a seventh multisystem network user interface screen 1400 on a first computing device (e.g., 114). In some embodiments, the seventh multisystem network user interface screen 1400 may include a study creation selectable object 1202, a study search function 1204, a study list header 1206, a computing profile selectable object 1208, a study list selectable object 1210, a computing profile header 1212, a user interface sign out selectable object 1216, a study sponsor indicator 1218, a study protocol indicator 1220, a national study number indicator 1222, a creator indicator 1224, a computing profile identification number 1226, a system alteration selectable object 1402, one or more system name selectable objects 1404, one or more system type indicators 1406, one or more system uniform resource locator selectable objects 1408, one or more system username selectable objects 1410, one or more system authentication key selectable objects 1412, and one or more system support selectable objects 1414. In some embodiments, selecting the one or more system support selectable objects 1414 redirects a user to a system support screen, shown in FIG. 17. Returning to FIG. 14, in some embodiments, the seventh multisystem network user interface screen 1400 simplifies login experience for accessing systems, such as sponsor systems for research sites. In some embodiments, the seventh multisystem network user interface screen 1400 and other user interface screens within the multisystem network do not comprise real time call outs to any applications, expediting the loading process for the user interface screens. In some embodiments, the study name will remain constant once entered by the user. In some embodiments, national study numbers will undergo a verification process to ensure the national study number is valid. In some embodiments, the verification process for a national study number comprises checking to make sure it matches a valid national clinical trial number on an official government website. In some embodiments, the computing profile may only be edited or deleted by the creator of the computing profile or operators of the multisystem network. In some embodiments, the user interface keeps a most recently used list of the last ten computing profiles 1208 for each user and portrays them on the user interface. In some embodiments, all users within the multisystem network are granted equal administrative rights within the multisystem network.

Figure 15:
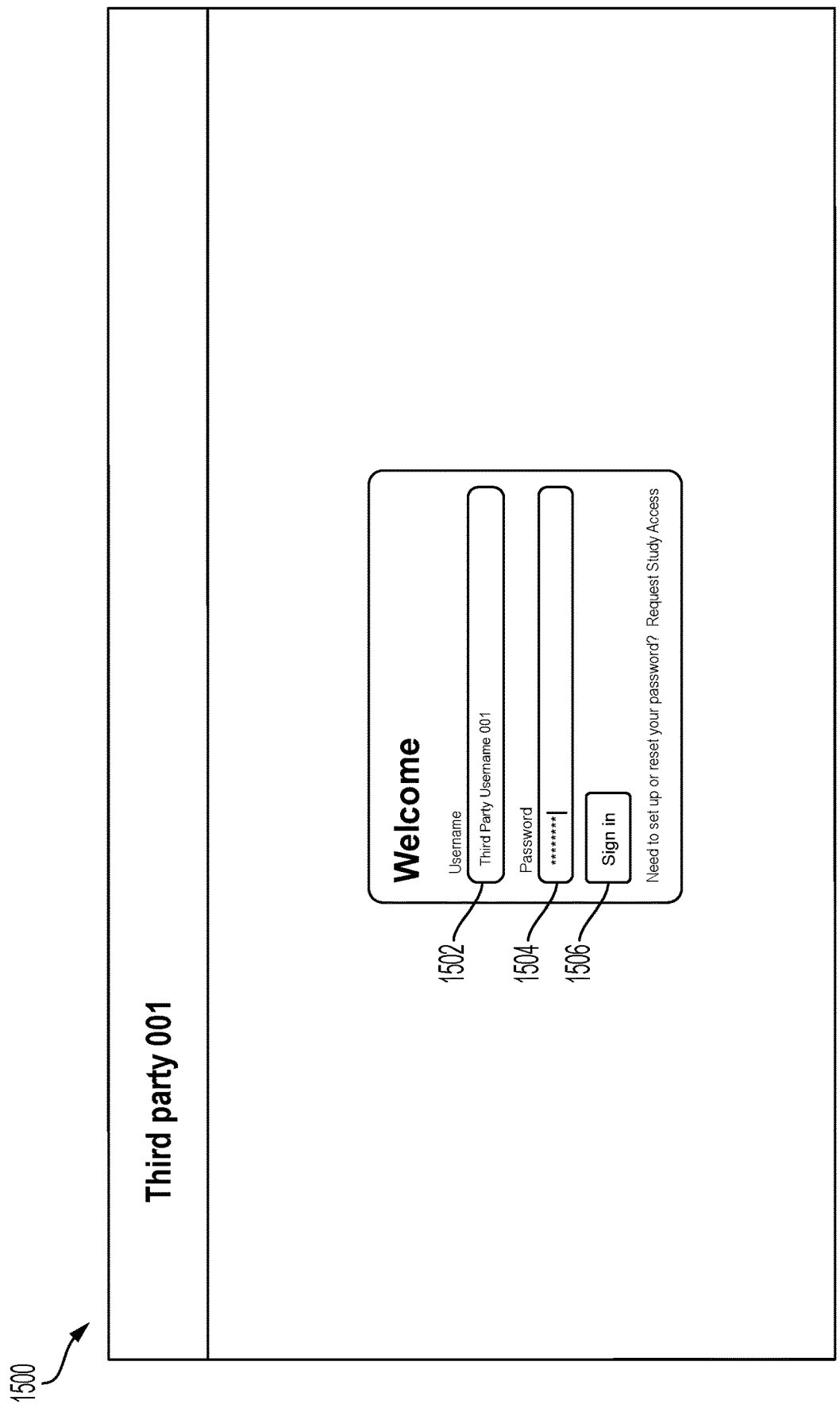
FIG. 15 shows a second potential embodiment of a third-party user interface associated with a multisystem network on an endpoint (or computing) device for interaction by users.

FIG. 15 shows a potential embodiment of a second system user interface screen 1500 on a first computing device (e.g., 114). In some embodiments, the second system user interface screen 1500 may include a system username submission field 1502, a system authentication key submission field 1504, and a system login selectable object 1506. In some embodiments, the system may comprise a software application associated with a study. In some embodiments, a user my enter data into the system username submission field 1502 and the system authentication key submission field 1504 by selecting one or more system user selectable objects 1410 and one or more system authentication key selectable objects 1412 from FIG. 14.

FIG. 16 shows a potential embodiment of an eighth multisystem network user interface screen 1600 on a first computing device (e.g., 114). In some embodiments, selecting one or more system uniform resource locator selectable object 1408 from FIG. 14 may redirect a user to the eighth multisystem network user interface screen 1600 without requiring the user to provide one or more authentication keys.

Figure 17:
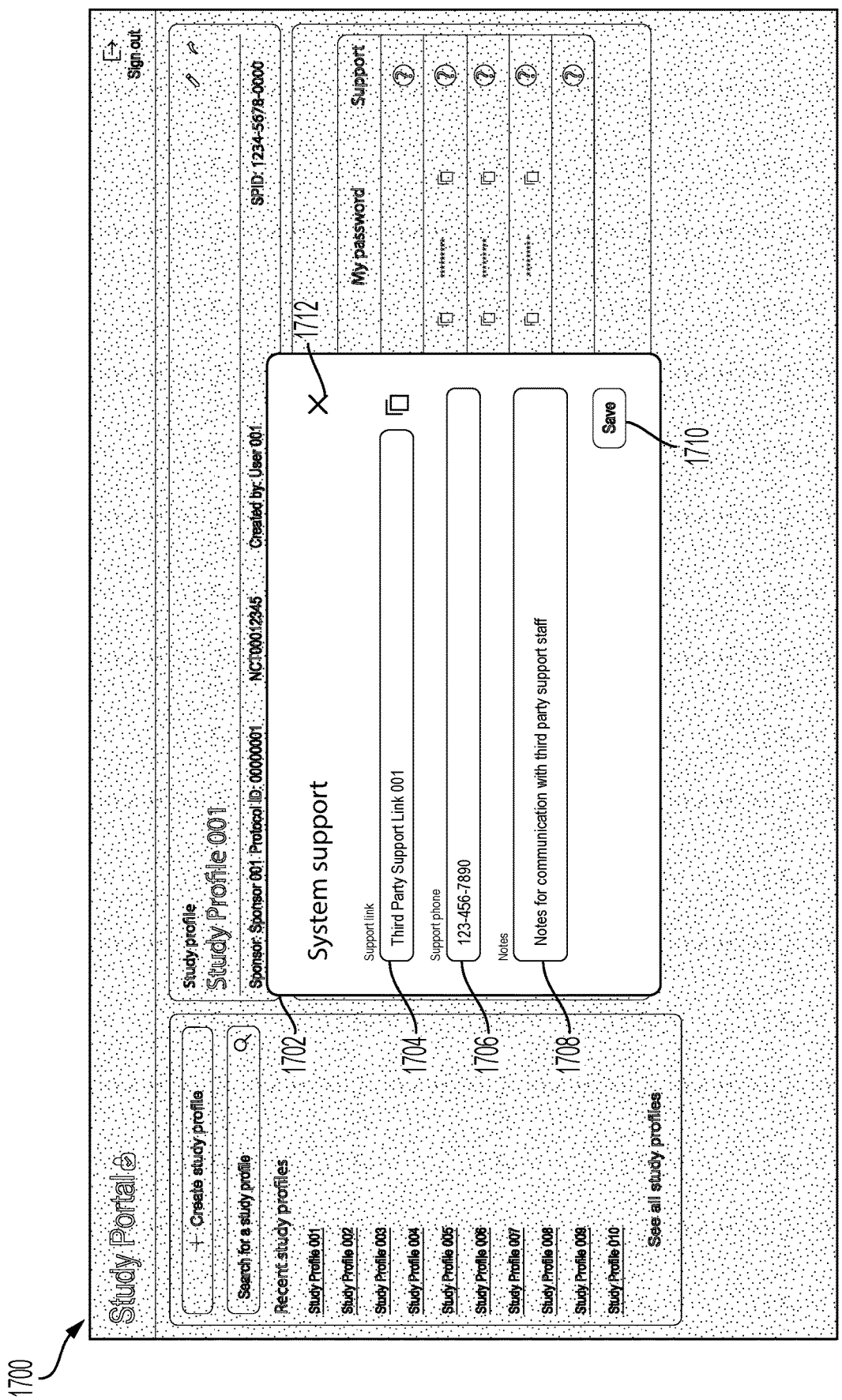
FIG. 17 shows a ninth potential embodiment of a user interface associated with a multisystem network on an endpoint (or computing) device for interaction by users.

FIG. 17 shows a potential embodiment of a ninth multisystem network user interface screen 1700 on a first computing device (e.g., 114). In some embodiments, the ninth multisystem network user interface screen 1700 comprises a system support pop-up window 1702, a system support link submission field 1704, a system support phone number submission field 1706, a system support notes submission field 1708, a system support confirmation selectable object 1710, and a system support cancellation selectable object 1712. In some embodiments, the support link submission field 1704 and the system support phone number submission field 1706 may contain pre-populated information.

Figure 18:
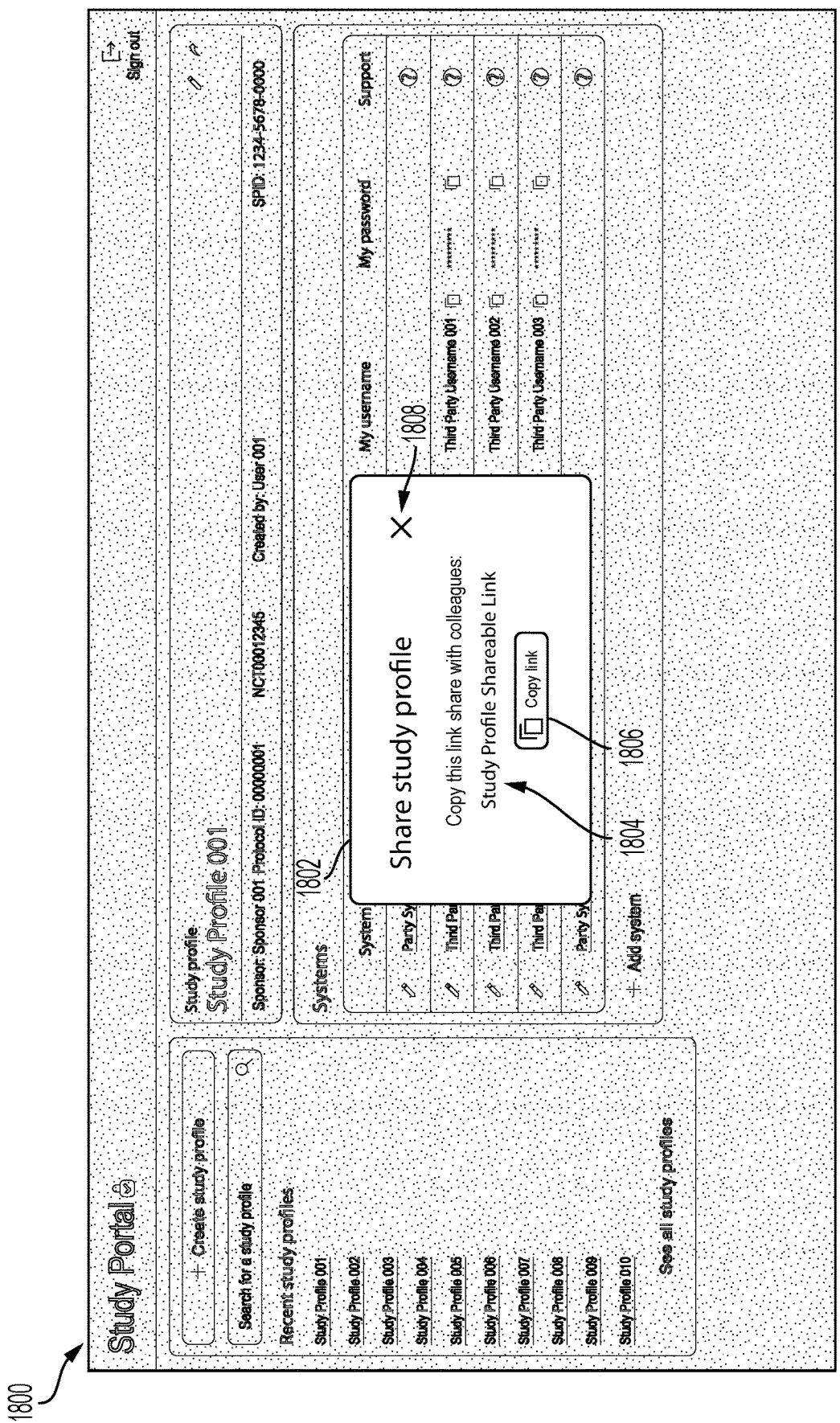
FIG. 18 shows a tenth potential embodiment of a user interface associated with a multisystem network on an endpoint (or computing) device for interaction by users.

FIG. 18 shows a potential embodiment of a tenth multisystem network user interface screen 1800 on a first computing device (e.g., 114). In some embodiments, the tenth multisystem network user interface screen 1800 comprises a share computing profile pop-up window 1802, a computing profile sharable link 1804, a computing profile copy link 1806, and a share computing profile cancellation selectable object 1808. In some embodiments, the computing profile sharable link 1804 and the computing profile copy link 1806 comprise selectable objects. In some embodiments, the computing profile shareable link 1804 and the computing profile copy link 1806 may be sent over email. In some embodiments, any user may select either the computing profile shareable link 1804 or the computing profile copy link 1806 to direct themselves or another user to the multisystem network and grant access to the computing profile. In some embodiments, if the user selecting either the computing profile shareable link 1804 or the computing profile copy link 1806 does not have a multisystem network account, then selecting either the computing profile shareable link 1804 or the computing profile copy link 1806 will result in a prompt and/or a redirection for the user to create and register a multisystem network account. In some embodiments, if the user selecting either the computing profile shareable link 1804 or the computing profile copy link 1806 has a multisystem network account, then selecting either the computing profile shareable link 1804 or the computing profile copy link 1806 will result in the associated computing profile being added to the list of other computing profiles in the user's existing multisystem network account. In some embodiments, confidential data is not shared via the computing profile shareable link 1804 or the computing profile copy link 1806. In some embodiments, username and authentication key information are considered private to the user who entered that information into the computing profile and are encrypted. In some embodiments, the username and authentication key information may only be displayed as a pop-up.

Figure 19:
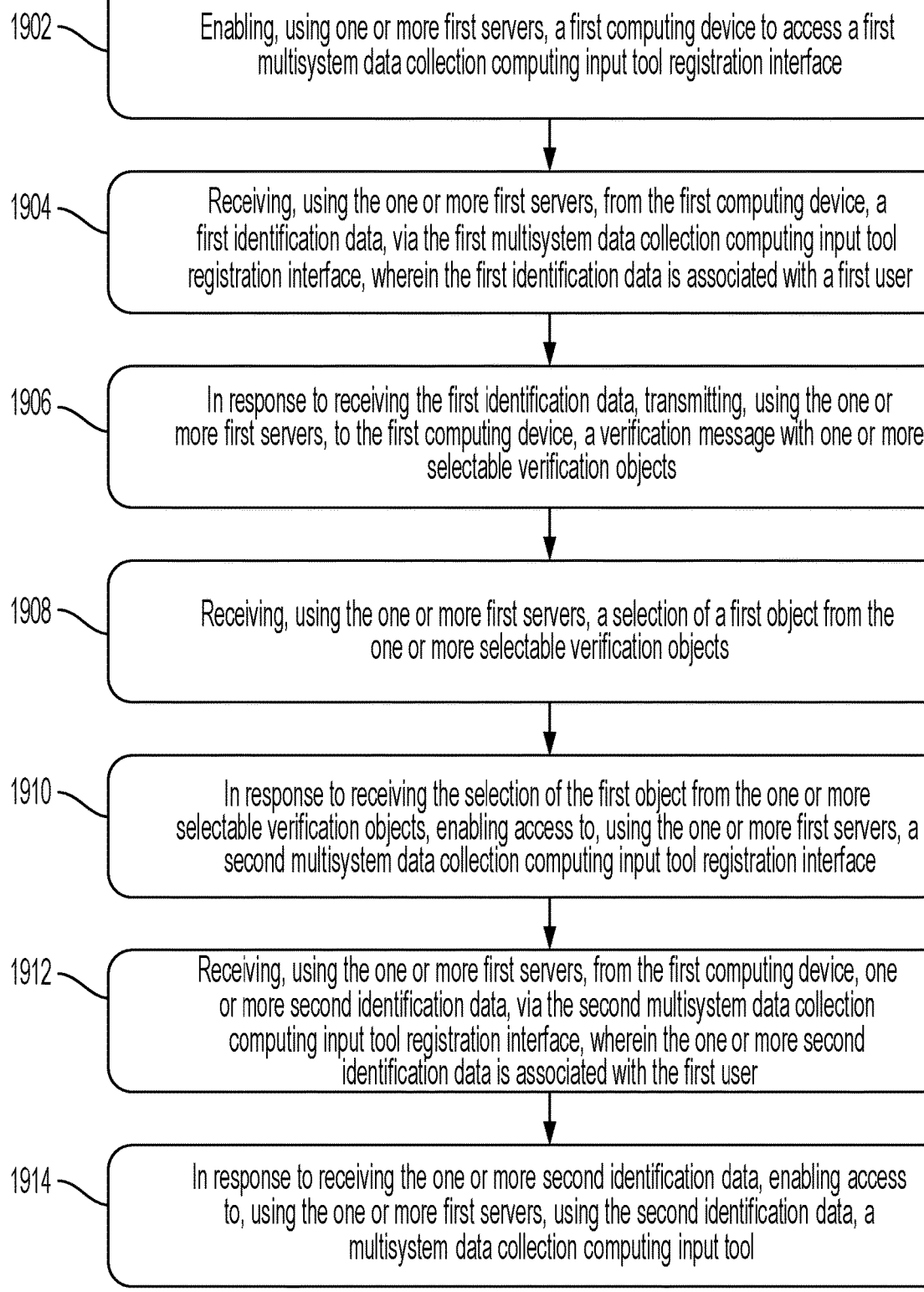
FIG. 19 shows a potential flowchart associated with a method of using a multisystem data collection computing input tool in a computing network.

FIG. 19 shows an example flowchart for using a multisystem data collection computing input tool in a computing network, with associated elements described in association with the steps of this flowchart and the discussion for at least FIGS. 1A-1D among additional descriptions herein, according to some embodiments of this disclosure. The various processes executed in the flowchart shown in FIG. 19 may be executed by one or more network such as the multisystem network discussed in association with one or more components of the system 100 shown in FIG. 1A. Further, the various blocks in FIG. 19 may be executed in a different order from that shown in FIG. 19. In FIG. 19 at block 1902, the method comprises enabling, using one or more first servers, a first computing device to access a first multisystem data collection computing input tool registration interface. In some embodiments, the one or more first servers and/or the first computing device may comprise a multisystem network, a system 100, a network 118, a data management system 102, a data management server 104, an endpoint device 114, a client application 116 or one or more data sources 120*a* . . . 120*n*. In some embodiments, a multisystem network comprises a network with one or more systems, or software programs, connected to each other physically, via communication equipment, and logically, as in a defined relationship, as peer or host, to other systems or software. In some embodiments, a first multisystem data collection computing input tool comprises a software program or tool on a multisystem network that collects data from a user, data storage, or another software. At block 1904, the method comprises receiving, using the one or more first servers, from the first computing device, a first identification data, via the first multisystem data collection computing input tool registration interface, wherein the first identification data is associated with a first user. In some embodiments, the first identification data may comprise an email address, a phone number, another form of contact information, or a form of personal information such as a person's name and birthday. In some embodiments, the first identification data is submitted by the user. In some embodiments, the first identification data is submitted by a third-party and not the user. At block 1906, the method comprises in response to receiving the first identification data, transmitting, using the one or more first servers, to the first computing device, a verification message with one or more selectable verification objects. In some embodiments, the verification message may comprise a confirmation email, text message, or the like. In some embodiments, the verification message is sent for a user to confirm that their contact information is correct and that the user would like to proceed with registering an account to the multisystem network. At block 1908, the method comprises receiving, using the one or more first servers, a selection of a first object from the one or more selectable verification objects. In some embodiments, the selection of a first object is the user confirming they would like to proceed with registering an account to the multisystem network. At block 1910, the method comprises in response to receiving the selection of the first object from the one or more selectable verification objects, enabling access to, using the one or more first servers, a second multisystem data collection computing input tool registration interface. In some embodiments, the second multisystem data collection computing input tool registration interface comprises a user interface for the user to input personal information such as a username, first name, last name, preferred language, locale, preferred time zone, and authentication key. In some embodiments, an authentication key comprises a user-generated or computer-generated password. At block 1912, the method comprises receiving, using the one or more first servers, from the first computing device, one or more second identification data, via the second multisystem data collection computing input tool registration interface, wherein the one or more second identification data is associated with the first user. In some embodiments, the second identification data comprises at least one of a username, first name, last name, preferred language, locale, preferred time zone, and authentication key. At block 1914, the method comprises in response to receiving the one or more second identification data, enabling access to, using the one or more first servers, using the second identification data, a multisystem data collection computing input tool. In some embodiments, the first identification data and the one or more second identification data are received from or configured by the first user. In some embodiments, the authentication key satisfies one or more security requirements, such as a minimum string length and particular combination of letters, numbers, and special characters. In some embodiments, the first identification data is identical to the username in the second identification data. In some embodiments, the one or more selectable verification objects comprise one or more hyperlinks or digital selectable icons to verify the ownership of an email address. In some embodiments, the verification message comprises a confirmation email. In some embodiments, the coinciding system comprises one or more computing system processors and the first computing device, which communicate via a cloud-based network. In some embodiments, the coinciding system comprises one or more computing system processors and the first computing device, which communicate via a local network. In some embodiments, the coinciding system comprises one or more computing system processors that are comprised in at least one of the first computing device or one or more servers located in at least one of more geographical locations. In some embodiments, the one or more second identification data are received from or configured by the first user.

Figure 20:
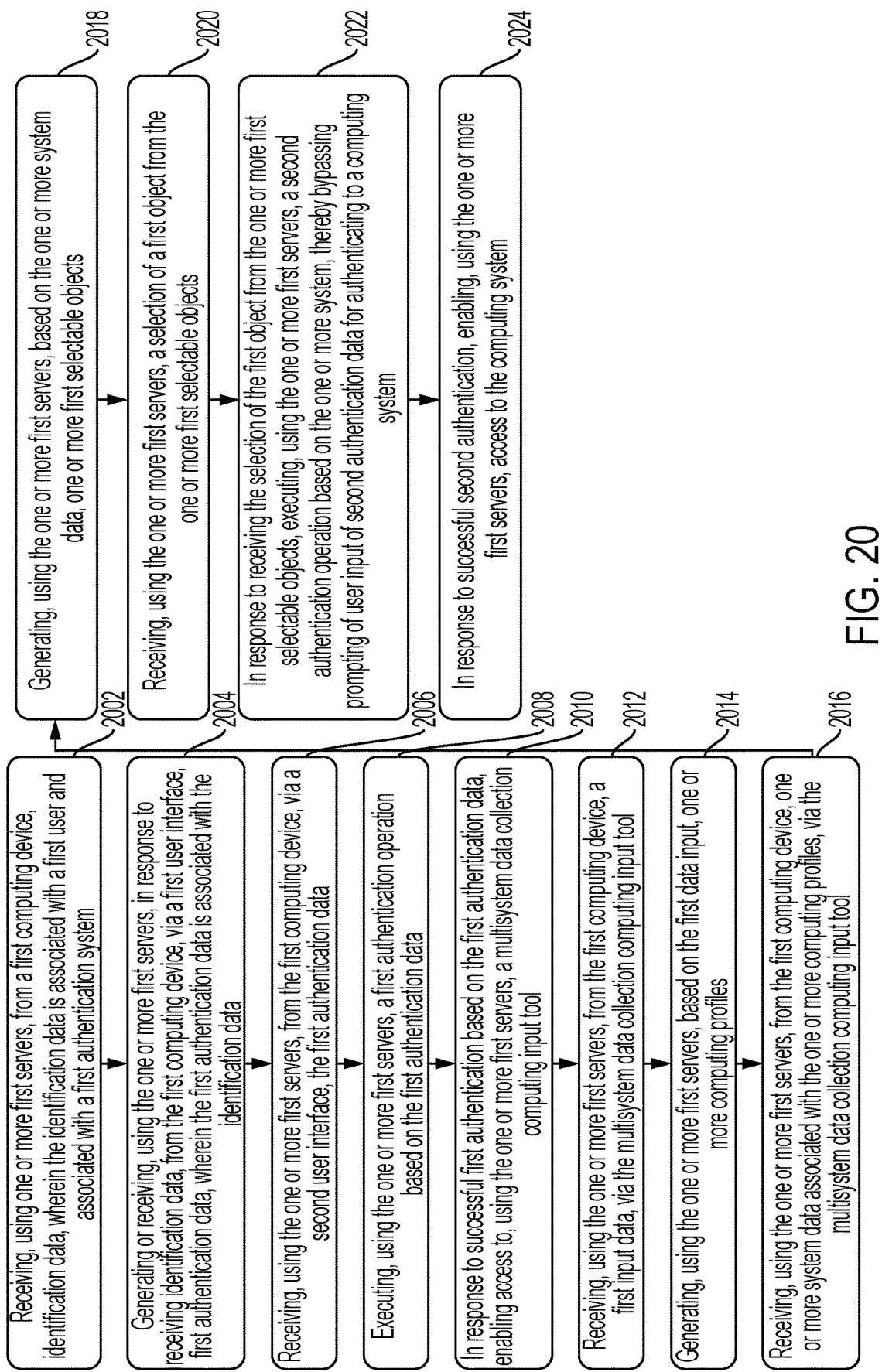
FIG. 20 shows a potential flowchart associated with a method of using a multisystem data collection computing input tool.

FIG. 20 shows an example flowchart of for using a multisystem data collection computing input tool with associated elements described in association with the steps of this flowchart and the discussion for at least FIGS. 1A-1D among additional descriptions herein, according to some embodiments of this disclosure. The various processes executed in the flowchart shown in FIG. 20 may be executed by one or more network such as the multisystem network discussed in association with one or more components of the system 100 shown in FIG. 1A. Further, the various blocks in FIG. 20 may be executed in a different order from that shown in FIG. 20. In FIG. 20 at block 2002, the method comprises receiving, using one or more first servers, from a first computing device, identification data, wherein the identification data is associated with a first user and associated with a first authentication system. In some embodiments, the identification data comprises at least one of a username, an email address, a phone number, another form of contact information, a first name, a last name, a preferred language, a locale, a preferred time zone, a birthday, and an authentication key. At block 2004, the method comprises generating or receiving, using the one or more first servers, in response to receiving identification data, from the first computing device, via a first user interface, first authentication data, wherein the first authentication data is associated with the identification data. In some embodiments, the first authentication data comprises a username and authentication key. At block 2006, the method comprises receiving, using the one or more first servers, from the first computing device, via a second user interface, the first authentication data. In some embodiments, the second user interface may comprise a multisystem network sign on interface. At block 2008, the method comprises executing, using the one or more first servers, a first authentication operation based on the first authentication data. In some embodiments, the first authentication operation comprises comparing hashes of the first authentication data received and either the identification data or first authentication data hash stored within the multisystem network. In some embodiments, an authentication operation comprises a captcha. At block 2010, the method comprises in response to successful first authentication based on the first authentication data, enabling access to, using the one or more first servers, a multisystem data collection computing input tool. At block 2012, the method comprises receiving, using the one or more first servers, from the first computing device, a first input data, via the multisystem data collection computing input tool. In some embodiments, the first input data comprises information related to a study. In some embodiments, the study may be a clinical study, geopolitical study, organizational study, etc. In some embodiments the information related to a study may comprise a study name, a study sponsor, a national study number, and an official study title. At block 2014, the method comprises generating, using the one or more first servers, based on the first data input, one or more computing profiles. In some embodiments, the one or more computing profiles comprise one or more study profiles, wherein the study profiles are associated with the study of the first input data. At block 2016, the method comprises receiving, using the one or more first servers, from the first computing device, one or more system data associated with the one or more computing profiles, via the multisystem data collection computing input tool. In some embodiments, the one or more system data comprises information related to a system or software program, such as the system's name, type, uniform resource locator, and the user's login information to the system, such as a username and authentication key. At block 2018, the method comprises generating, using the one or more first servers, based on the one or more system data, one or more first selectable objects. In some embodiments, the one or more first selectable objects comprise links to bypass user authentication protocols and/or prompts for respective systems by automatically entering any required authentication information. In some embodiments, the one or more first selectable objects comprise computing commands that enable a user to copy system information, such as an authentication key, and paste it into the appropriate submission field on the system's platform. At block 2020, the method comprises receiving, using the one or more first servers, a selection of a first object from the one or more first selectable objects. In some embodiments, the selection comprises a user clicking on buttons to activate the links or computing commands. In some embodiments, a selection may comprise tapping, checking a box, clicking with a computer mouse, vocally issuing an affirmation, and other forms of affirmatively selecting a particular action or option.

At block 2022, the method comprises in response to receiving the selection of the first object from the one or more first selectable objects, executing, using the one or more first servers, a second authentication operation based on the one or more system data, thereby bypassing prompting of user input of second authentication data for authenticating to a computing system. In some embodiments, the second authentication operation comprises bypassing user authentication protocols for respective systems by automatically entering any required authentication information or initiating computing commands that enable a user to copy system information, such as an authentication key, and paste it into the appropriate submission field on the system's platform. At block 2024, the method comprises in response to successful second authentication, enabling, using the one or more first servers, access to the computing system. In some embodiments, the computing system comprises a system within the multisystem network. In some embodiments, at least one of the identification data, the first authentication data, the first input data, and the one or more system data are received from or configured by the first user. In some embodiments, the first authentication data comprises a username and password associated to the first user and to the multisystem data collection computing input tool. In some embodiments, the first input data comprises data associated with a study, wherein the data associated with the study comprises one or more network control terminal data associated with the study. In some embodiments, the one or more system data comprises at least one of one or more computing data, one or more uniform resource locators associated with the one or more computing data, one or more identification data, and one or more authentication data. In some embodiments, the one or more first selectable objects comprise one or more hyperlinks, digital commands, or reproducible digital files to save or copy one or more system data components associated with the system data. In some embodiments, system data components may comprise at least one of one or more computing data, one or more uniform resource locators associated with the one or more computing data, one or more identification data, a system name indicator 1302, a system type indicator 1304, a system uniform resource locator indicator 1306, a system username indicator 1308, a system authentication key indicator, and one or more authentication data, as shown in FIG. 13. Going back to FIG. 20, in some embodiments, the one or more first selectable objects comprise one or more hyperlinks to bypass one or more authentication operations, wherein the one or more authentication operations comprises the second authentication operation. In some embodiments, the one or more hyperlinks are used to bypass one or more authentication operations because the system authorization credentials for particular systems within or external to the multisystem network were preapproved during the initial multisystem network registration process. In some embodiments, the system data may comprise one or more support uniform resource locator data 1704, one or more support communication data 1706, and one or more user-generated data 1708, as shown in FIG. 17. Going back to FIG. 20, in some embodiments of the corresponding system, the one or more computing system processors, and the first computing device communicate via a cloud-based network. In some embodiments of the corresponding system, the one or more computing system processors are comprised in at least one of the first computing device or one or more servers located in at least one of more geographical locations.

In some embodiments, the multisystem network contains a user check function comprising one or more temporary digital tokens to facilitate one or more systems in detecting if a multisystem network user account is recognized and preapproved for authentication by the one or more systems. In some embodiments, if the multisystem network user account is recognized and preapproved by the one or more systems, the associated multisystem network user may bypass one or more authentication operations associated with the one or more systems. In some embodiments, the multisystem network would generate one or more temporary digital tokens. In some embodiments, the one or more temporary digital tokens are limited to a certain number of tokens (e.g., one token) per multisystem network user account. In some embodiments, the one or more temporary digital tokens are limited to a certain number of tokens (e.g., one token) per user check action, wherein the user check action comprises transmitting the one or more temporary digital tokens from a multisystem user account to one or more systems. In some embodiments, the one or more temporary digital tokens would comprise a randomly generated string value or randomly generated number, wherein the randomly generated string value or randomly generated number is associated with the multisystem network user account. In some embodiments, the one or more temporary digital tokens would comprise an encrypted string [based on an encryption protocol] containing the multisystem network user account information. In some embodiments, the one or more systems contain an encryption key for decrypting [based on the encryption protocol] the one or more temporary digital tokens. In some embodiments, the encrypted string may also comprise a digital authorization signature. In some embodiments, the digital authorization signature authenticates the sender of the temporary digital token. In some embodiments, the association between the randomly generated string value or randomly generated number to the multisystem network user account is not inherently available to the one or more systems. In some embodiments, a user may transmit the one or more temporary digital tokens associated with the multisystem network user account to the one or more systems within or external to the multisystem network account. In some embodiments, the one or more systems request one or more temporary digital tokens associated with one or more multisystem network user accounts. In some embodiments, the multisystem network generates one or more temporary digital tokens associated with one or more multisystem network user accounts and may transfer the one or more temporary digital tokens to one or more systems within or external to the multisystem network. In some embodiments, the one or more systems may comprise an endpoint to receive the one or more temporary digital tokens. In some embodiments, the one or more systems may comprise a method or system for connecting to the multisystem network to request the multisystem network user account information associated with the one or more temporary digital tokens. In some embodiments, the one or more systems may submit one or more requests to the multisystem network to obtain the multisystem network user account information associated with the randomly generated string value or number associated with the one or more temporary digital tokens. In some embodiments, the multisystem network may respond to the one or more requests by providing the multisystem network user account information associated with the randomly generated string value or randomly generated number contained within the one or more temporary digital tokens to the one or more systems. In some embodiments, the one or more systems may cross-reference the multisystem network user account information associated with the one or more temporary digital tokens with a local or cloud-based database associated with the one or more systems to determine if the multisystem network user account is recognized and/or preapproved by the one or more systems. In some embodiments, the one or more systems would then transmit a response to the multisystem network either confirming or denying recognition and/or preapproval of the multisystem network user account associated with the one or more temporary digital tokens within the one or more systems. In some embodiments, the recognition and/or preapproval of the multisystem network user account within the one or more systems may result in the multisystem network user account bypassing authentication operations or prompts when the user navigates from multisystem network user interfaces to user interfaces associated with the one or more systems.

Figure 21:
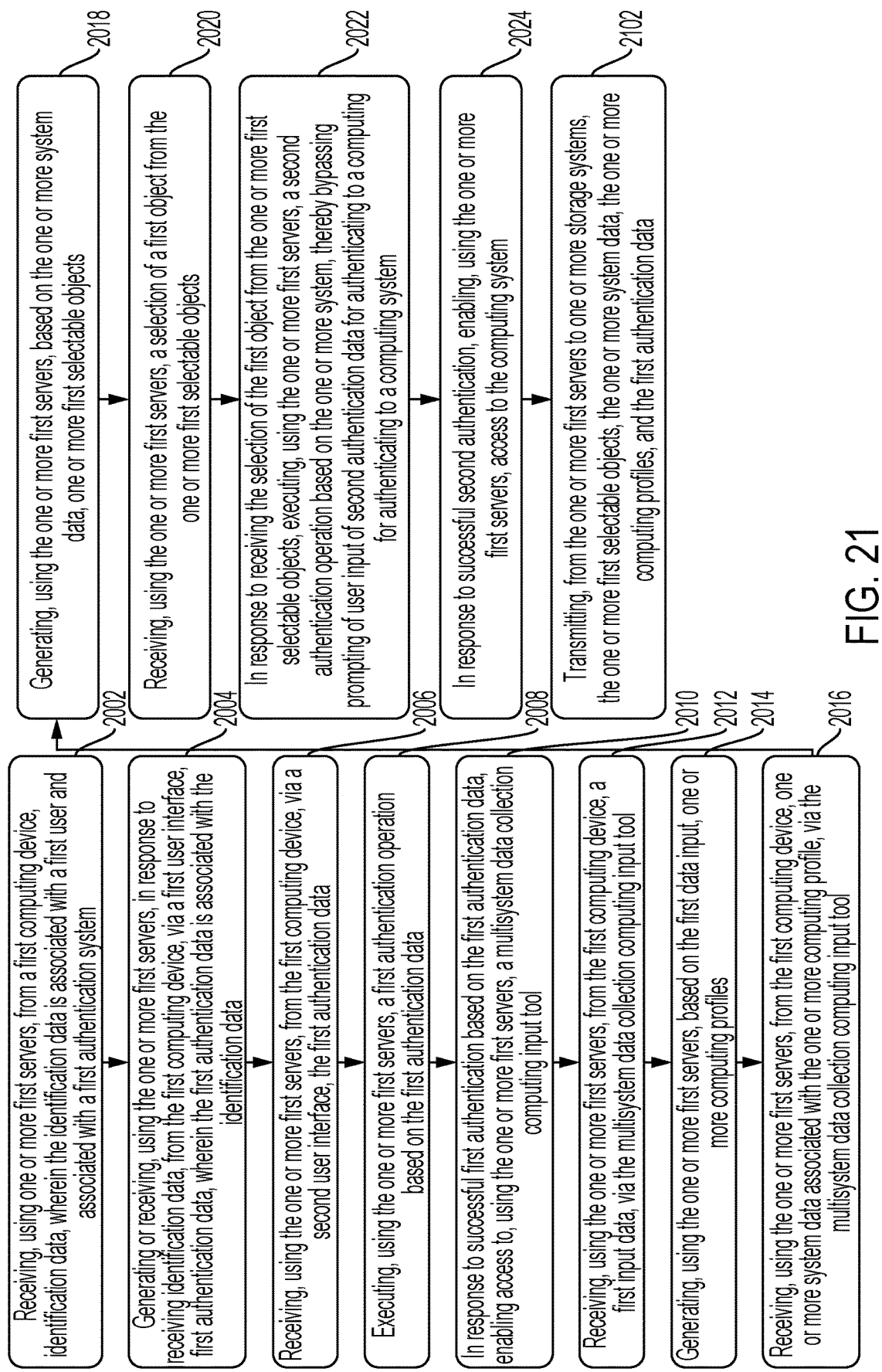
FIG. 21 shows a second potential flowchart associated with a method of using a multisystem data collection computing input tool.

FIG. 21 shows an example flowchart of for using a multisystem data collection computing input tool with associated elements described in association with the steps of this flowchart and the discussion for at least FIGS. 1A-1D among additional descriptions herein, according to some embodiments of this disclosure. The various processes executed in the flowchart shown in FIG. 21 may be executed by one or more network such as the multisystem network discussed in association with one or more components of the system 100 shown in FIG. 1A. Further, the various blocks in FIG. 21 may be executed in a different order from that shown in FIG. 21. In FIG. 21 at blocks 2002 through 2024, the flowchart in FIG. 21 is identical to blocks 2002 through 2024 in FIG. 20. At block 2102, the method comprises transmitting, from the one or more first servers to one or more storage systems, at least one of the one or more first selectable objects, the one or more system data, the one or more computing profiles, and the first authentication data. In some embodiments, the one or more storage systems comprise at least one of the one or more repositories 112, one or more data storage system 106, a storage contained in a data source 120, a storage on a cloud-based server, or a storage on a computing device 114, as shown in FIG. 1A. In some embodiments, the one or more storage systems are accessed with the multisystem data collection computing input tool.

Figure 22:
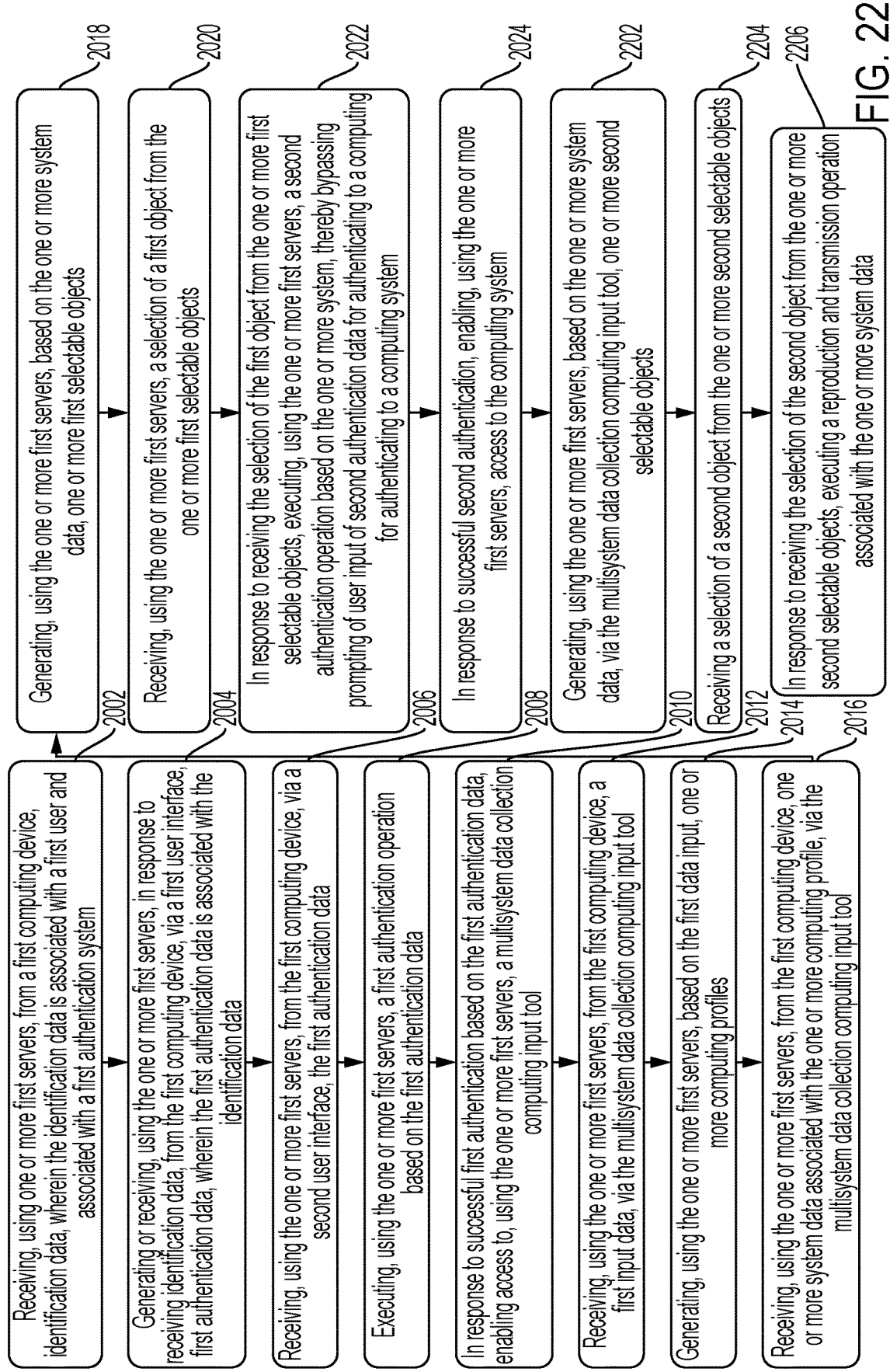
FIG. 22 shows a third potential flowchart associated with a method of using a multisystem data collection computing input tool.

FIG. 22 shows an example flowchart of for using a multisystem data collection computing input tool with associated elements described in association with the steps of this flowchart and the discussion for at least FIGS. 1A-1D among additional descriptions herein, according to some embodiments of this disclosure. The various processes executed in the flowchart shown in FIG. 22 may be executed by one or more network such as the multisystem network discussed in association with one or more components of the system 100 shown in FIG. 1A. Further, the various blocks in FIG. 22 may be executed in a different order from that shown in FIG. 22. In FIG. 22 at blocks 2002 through 2024, the flowchart in FIG. 22 is identical to blocks 2002 through 2024 in FIG. 20. At block 2202, the method comprises generating, using the one or more first servers, based on the one or more system data, via the multisystem data collection computing input tool, one or more second selectable objects. In some embodiments, the one or more second selectable objects comprises a computing command to copy and share system data from a user's account in the multisystem network to another user or device either inside or external to the multisystem network. At block 2204, the method comprises receiving a selection of a second object from the one or more second selectable objects. At block 2206 the method comprises in response to receiving the selection of the second object from the one or more second selectable objects, executing a reproduction and transmission operation associated with the one or more system data. In some embodiments, the reproduction and transmission operation associated with the one or more system data comprises executing a computing command to copy and share system data from a user's account in the multisystem network to another user or device either inside or external to the multisystem network.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections. In all embodiments, any submission field comprise fill-in-the-blank, checkboxes, dropdown menus, or other information gathering features. In all embodiments, any selectable objects may comprise a hyperlink, selectable redirection icon, pre-compiled API, computing command, etc. In all embodiments, any search function may comprise a submission field or selectable object to locate terms, characters, and files. In some embodiments, an authentication key may comprise a user-generated or computer-generated password in the form of a combination of letters, numbers, and special characters.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code produced by a compiler and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals. In some embodiments, the terms "multisystem network" and "system" may be used interchangeably. Therefore, a system within the multinetwork system could be performing any of the functions or computing operations described as being performed by the multisystem network.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically, and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure but should not be constrained by the headings set forth herein.

What is claimed is:

1. A method for using a multisystem data collection computing input tool in a computing network, the method comprising:

enabling, using one or more first servers, a first computing device to access a first multisystem data collection computing input tool registration interface;

receiving, using the one or more first servers, from the first computing device, a first identification data, via the first multisystem data collection computing input tool registration interface, wherein the first identification data is associated with a first user;

in response to receiving the first identification data, transmitting, using the one or more first servers, to the first computing device, a verification message with one or more selectable verification objects;

receiving, using the one or more first servers, a selection of a first object from the one or more selectable verification objects;

in response to receiving the selection of the first object from the one or more selectable verification objects, enabling access to, using the one or more first servers, a second multisystem data collection computing input tool registration interface;

receiving, using the one or more first servers, from the first computing device, one or more second identification data, via the second multisystem data collection computing input tool registration interface, wherein the one or more second identification data is associated with the first user; and in response to receiving the one or more second identification data, enabling access to, using the one or more first servers, using the one or more second identification data, a multisystem data collection computing input tool.

2. The method of claim 1, wherein the first identification data and the one or more second identification data are received from or configured by the first user.

3. The method of claim 1, wherein the first identification data comprises an email address.

4. The method of claim 1, wherein the one or more second identification data comprises at least one of a username, a user's first name, a user's last name, a user-preferred language, a user-preferred time zone, and a login password.

5. The method of claim 4, wherein the login password meets one or more password security requirements.

6. The method of claim 4, wherein the first identification data is identical to the username in the one or more second identification data.

7. The method of claim 1, wherein the one or more selectable verification objects comprise one or more hyperlinks or digital selectable icons to verify an ownership of an email address.

8. The method of claim 1, wherein the verification message comprises a confirmation email.

9. A system for using a multisystem data collection computing input tool in a computing network, the system comprising:
- one or more computing system processors; and
- memory storing instructions that, when executed by the one or more computing system processors, cause the system to:
- enable a first computing device to access a first multisystem data collection computing input tool registration interface;
- receive, from the first computing device, a first identification data, via the first multisystem data collection computing input tool registration interface, wherein the first identification data is associated with a first user;
- in response to receiving the first identification data, transmit, to the first computing device, a verification message with one or more selectable verification objects;
- receive a selection of a first object from the one or more selectable verification objects;
- in response to receiving the selection of the first object from the one or more selectable verification objects, enable access to a second multisystem data collection computing input tool registration interface;
- receive, from the first computing device, one or more second identification data, via the second multisystem data collection computing input tool registration interface, wherein the one or more second identification data is associated with the first user; and
- in response to receiving the one or more second identification data, enable access to, using the one or more second identification data, a multisystem data collection computing input tool.

10. The system of claim 9, wherein the one or more computing system processors and the first computing device communicate via a cloud-based network.

11. The system of claim 9, wherein the one or more computing system processors and the first computing device communicate via a local network.

12. The system of claim 9, wherein the first identification data and the one or more second identification data are received from or configured by the first user.

13. The system of claim 9, wherein the one or more computing system processors are comprised in at least one of the first computing device or one or more servers located in at least one of more geographical locations.

14. A non-transitory computer-readable medium comprising code configured or operable to:
- enable a first computing device to access a first multisystem data collection computing input tool registration interface;
- receive, from the first computing device, a first identification data, via the first multisystem data collection computing input tool registration interface, wherein the first identification data is associated with a first user;
- in response to receiving the first identification data, transmit, to the first computing device, a verification message with one or more selectable verification objects;
- receive, a selection of a first object from the one or more selectable verification objects;
- in response to receiving the selection of the first object from the one or more selectable verification objects, enable access to a second multisystem data collection computing input tool registration interface;
- receive, from the first computing device, one or more second identification data, via the second multisystem data collection computing input tool registration interface, wherein the one or more second identification data is associated with the first user; and
- in response to receiving the one or more second identification data, enable access to, using the one or more second identification data, a multisystem data collection computing input tool.

15. The non-transitory computer-readable medium of claim 14, wherein the first identification data is received from or configured by a second user.

16. The non-transitory computer-readable medium of claim 15, wherein the one or more second identification data are received from or configured by the first user.

17. The non-transitory computer-readable medium of claim 14, wherein the first identification data comprises an email address.

18. The non-transitory computer-readable medium of claim 14, wherein the one or more second identification data comprises at least one of a username, a user's first name, a user's last name, a user-preferred language, a user preferred time zone, and a login password.

19. The non-transitory computer-readable medium of claim 18, wherein the login password satisfies one or more password security requirements.

20. The non-transitory computer-readable medium of claim 18, wherein the first identification data is identical to the username in the one or more second identification data.

* * * * *